(12) United States Patent
Mello et al.

(10) Patent No.: US 7,990,543 B1
(45) Date of Patent: Aug. 2, 2011

(54) SURFACE CHARACTERIZATION BASED ON OPTICAL PHASE SHIFTING INTERFEROMETRY

(75) Inventors: Michael Mello, Pasadena, CA (US); Ares J. Rosakis, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 320 days.

(21) Appl. No.: 12/203,050

(22) Filed: Sep. 2, 2008

Related U.S. Application Data

(60) Provisional application No. 60/967,297, filed on Aug. 31, 2007, provisional application No. 60/993,657, filed on Sep. 12, 2007, provisional application No. 60/967,296, filed on Aug. 31, 2007, provisional application No. 60/999,006, filed on Oct. 15, 2007.

(51) Int. Cl.
  *G01B 11/02* (2006.01)
  *G01B 9/02* (2006.01)
(52) U.S. Cl. .................. 356/512; 356/520; 356/521
(58) Field of Classification Search .............. 356/35.5, 356/489, 495, 512, 520, 521
See application file for complete search history.

(56) References Cited

U.S. PATENT DOCUMENTS

| | | | |
|---|---|---|---|
| 6,031,611 A | 2/2000 | Rosakis et al. | |
| 6,268,883 B1 | 7/2001 | Zehnder et al. | |
| 6,469,788 B2 | 10/2002 | Boyd et al. | |
| 6,781,702 B2 | 8/2004 | Giannakopoulos et al. | |
| 7,363,173 B2 | 4/2008 | Rosakis et al. | |
| 7,487,050 B2 | 2/2009 | Rosakis et al. | |
| 7,538,891 B1 * | 5/2009 | Mello et al. | 356/520 |
| 7,760,363 B2 * | 7/2010 | Chen et al. | 356/491 |
| 2002/0012122 A1 | 1/2002 | Boyd et al. | |
| 2003/0106378 A1 | 6/2003 | Giannakopoulos et al. | |
| 2005/0030551 A1 | 2/2005 | Rosakis et al. | |
| 2005/0278126 A1 | 12/2005 | Rosakis et al. | |
| 2006/0039007 A1 * | 2/2006 | Kim et al. | 356/495 |
| 2006/0146342 A1 * | 7/2006 | Doerband et al. | 356/512 |
| 2006/0276977 A1 | 12/2006 | Rosakis et al. | |
| 2007/0019203 A1 * | 1/2007 | Jansen | 356/495 |
| 2007/0180919 A1 | 8/2007 | Rosakis et al. | |

* cited by examiner

*Primary Examiner* — Michael A Lyons
(74) *Attorney, Agent, or Firm* — Perkins Coie LLP

(57) ABSTRACT

Apparatus, techniques and systems for implementing an optical interferometer to measure surfaces, including mapping of instantaneous curvature or in-plane and out-of-plane displacement field gradients of a sample surface based on obtaining and processing four optical interferograms from a common optical reflected beam from the sample surface that are relatively separated in phase by $\pi/2$.

17 Claims, 23 Drawing Sheets

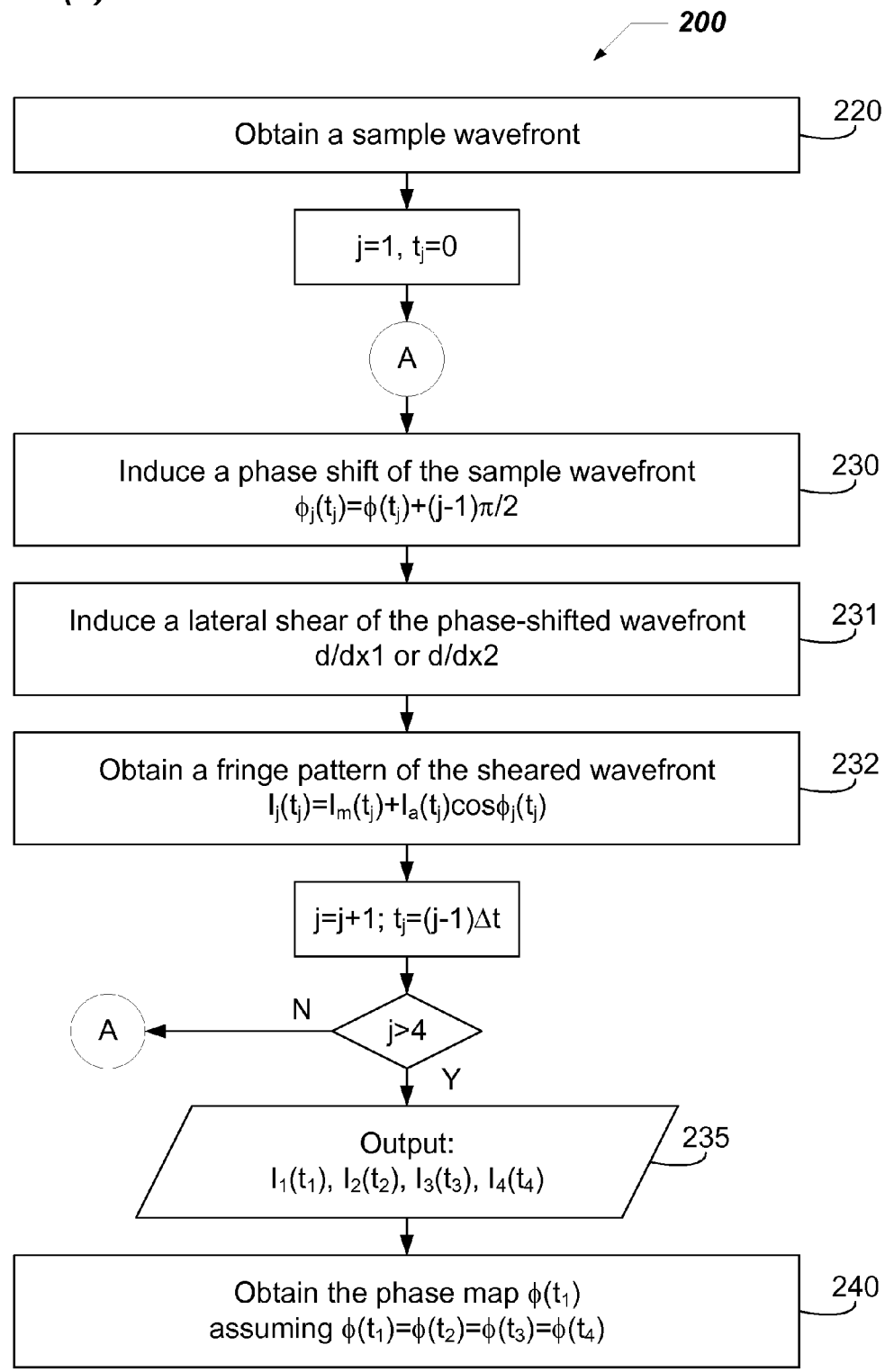

SURFACE CHARACTERIZATION BASED ON OPTICAL PHASE SHIFTING INTERFEROMETRY

PRIORITY CLAIMS

This application claims the benefits of the following four U.S. patent applications:

1. U.S. Provisional Application No. 60/967,297 entitled "Compact diffraction grating based quad beam splitter arrangement for the creation of four parallel beams" and filed on Aug. 31, 2007,
2. U.S. Provisional Application No. 60/993,657 entitled "Compact diffraction grating based quad beam splitter arrangement for the creation of four parallel beams" and filed on Sep. 12, 2007,
3. U.S. Provisional Application No. 60/967,296 entitled "Concept for Spatial (instantaneous) phase shifting of Coherent Gradient Sensor (CGS) interferometer" and filed on Aug. 31, 2007, and
4. U.S. Provisional Application No. 60/999,006 entitled "Four Channel Spatial Phase Shifting Device and Wave Front Shearing Interferometer" and filed on Oct. 15, 2007.

The disclosures of the above four U.S. patent applications are incorporated by reference as part of the specification of this application.

FEDERALLY SPONSORED RESEARCH OR DEVELOPMENT

The U.S. Government has certain rights in this invention pursuant to Grant No. DE-FG52-06NA26209-T-103505 awarded by Department of Energy and Grant No. N00014-06-1-0730 awarded by Office of Naval Research.

BACKGROUND

This application relates to optical sensing of surfaces, including optical measurements of surface slopes and other topographical properties of surfaces in flat panels, substrates, and wafers.

Optical interferometry uses optical interference between two at least partially mutually coherent optical beams to obtain useful information carried by the optical interference patterns. For example, optical interferometry can be used for optical sensing and optical interference patterns can be processed to extract information embedded in the wavefront of at least one of the beams as an optical probe beam which interacts with a sample under measurement.

SUMMARY

This application describes, among others, apparatus, techniques and systems for implementing an optical interferometer to measure surfaces, including mapping of in-plane and out-of-plane displacement field gradients of a sample surface.

In one aspect, a method for optically characterizing a surface is described to simultaneously obtain four optical interferograms from a sample surface that are relatively separated in phase by $\pi/2$. The method also includes processing the obtained four optical interferograms to extract information on the sample surface.

In another aspect, a system is described to contain a probe beam module to generate a coherent optical probe beam and to direct the probe beam to a sample surface. The system also includes a wavefront replicator module configured to generate four spatially separated copies of a sample wavefront. The phase of the sample wavefront carries information on the sample surface addressed by the probe beam. The system includes an interferometer configured to simultaneously shift by $\pi/2$ the relative phase of each copy of the sample wavefront. The interferometer causes interference of the four phase shifted copies of the sample wavefront with a corresponding reference wavefront. The interferometer also simultaneously generates four interferograms having a common phase term. The common phase term is the phase of the sample wavefront. The system includes a phase map processor to process the four simultaneously generated interferograms to obtain the common phase term. The system also includes a surface map processor to generate a map of surface shape parameters of the sample surface.

In yet another aspect, a method is described to include obtaining four spatially-separated copies of an optical wavefront. The phase of the optical wavefront carries information on a sample surface. The method includes simultaneously generating four interferograms of the four spatially-separated copies of the optical wavefront. The interferograms are relatively separated in phase by $\pi/2$ and have a common phase term equal to the phase of the optical wavefront. The method also includes processing the generated four interferograms to obtain the common phase term carrying information on a sample surface.

In another aspect, an apparatus includes a sample holder to hold a sample under test. The apparatus also includes an optical probe module to direct coherent light to the sample surface. The apparatus contains a first grating element including four gratings shifted laterally by a quarter pitch between adjacent gratings to shift by $\pi/2$ the relative phase of four spatially separated copies of a sample wavefront that carries information on the sample surface. The apparatus also includes a second grating element downstream from the first grating element having a uniform groove pattern and same pitch as the gratings of the first grating element. The second grating element shears the four phase shifted copies of the sample wavefront. The apparatus contains an imaging component to capture four phase shifted shearing interferograms generated by the first and second grating elements. The apparatus includes a processor to manipulate the generated four interferograms to obtain information on the sample surface.

The details of these and other aspects of the apparatus, techniques and systems for implementing an optical interferometer to measure surfaces are set forth in the accompanying drawings, the description and the claims below.

BRIEF DESCRIPTION OF DRAWINGS

FIG. 2(b) shows an exemplary method based on phase shifting interferometry for obtaining whole field phase mapping of a sample surface.

DETAILED DESCRIPTION

Figure 1A:
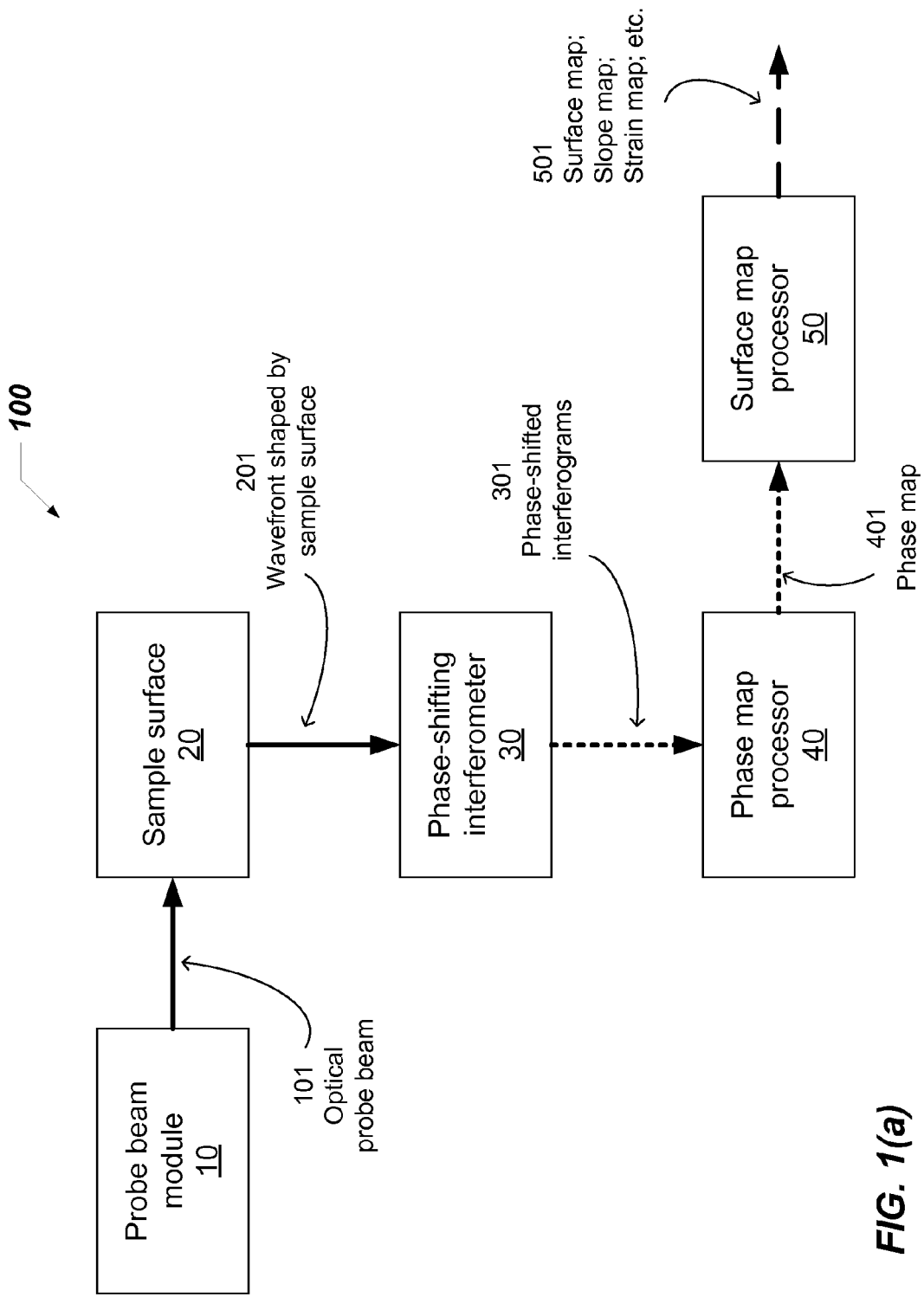
FIG. 1(a) shows an exemplary system including a phase shifting interferometer for obtaining whole field mapping of various parameters of a sample surface.

In-plane displacements and out-of-plane displacements of a sample surface can be measured using various optical interferometric techniques, including optical interferometric measurements based on lateral shearing techniques. The wavefront of a probe beam after reflection or diffraction of the surface of a sample is distorted by in-plane displacements and out-of-plane displacements on the sample surface. To obtain a distribution or map of the out-of-plane and in-plane displacement field gradients corresponding to the sample surface, the phase distribution map of the distorted wavefront is determined. To quantify the phase map corresponding to a sample surface of interest, a set of at least three optical shearing interferograms of the distorted wavefront are obtained by a shearing interferometer. The shearing interferometer contains an element situated in the path of the distorted wavefront (or in the path of a reference wavefront for other types of phase shifting interferometers) which can introduce known phase shifts. By measuring the intensity pattern for each of the phase shifted interferograms, the phase map of the distorted wavefront can be obtained. The topographic profile of the surface or various out-of-plane and in-plane displacement maps can be obtained once the phase map is known.

The phase shifting element of various phase shifting interferometers can include a translation stage. The motion of the translation stage can introduce misalignments, misregistrations or vibrations which manifest as noise in the calculation of the phase map. Moreover, even if the noise caused by moving translation stages can be mitigated, the phase shifted interferograms acquired upon movement of a phase shifting element are taken in successive order (by definition). The set of interferograms acquired in this manner can be used in the calculation of the phase map only assuming that the surface of the sample does not change on the time scale of successive excursions of the translation stage. Therefore, the successively acquired phase shifted interferograms contribute only to a time-averaged phase profile of the distorted wavefront, and are not representative of the instantaneous state of the sample surface.

The techniques, apparatus and systems described in this application allow for obtaining simultaneous (instantaneous) phase shifted interferograms of the distorted wavefront. Once a set of four interferograms are obtained in one shot, a true real-time phase map of the distorted wavefront can be obtained, in contrast to the time-averaged phase map that is obtained using other phase shifting interferometers. Upon determining the real-time phase map of the distorted wavefront, many of the parameters specific to the surface can be obtained dynamically, such as for example, surface profile, out-of-plane and in-plane displacement field gradients corresponding to the sample surface, etc. For instance the surface of a flat panel display subject to vibrations can be monitored by acquiring successive sets of phase maps characteristic to the instantaneous surface shape of the vibrating flat panel display. The evolution of the surface map, or the out-of-plane and in-plane displacement field gradient maps corresponding to the sample surface monitored in this manner can be very useful for understanding the failure modes of flat panel displays, during transport or under extreme dynamic conditions, such as on the battlefield.

FIG. 1(a) illustrates diagrammatically a system 100 which uses a phase shifting interferometer to obtain a profile (elevation map), slope (out-of-plane distortions) and strain fields (in-plane distortions) of a sample surface. Each block of the diagram represents a functional module and can contain multiple components as indicated in subsequent sections. Each arrow connecting the diagram blocks represents the output of the prior block and the input of the subsequent block, respectively.

The probe beam module 10 contains an optical source and beam steering components to direct the probe beam 101 to the sample surface 20. In the interferometric examples described in this application, the probe beam 101 is coherent and collimated. Specific implementations of the probe beam module 10 are discussed below.

The sample surface is represented by block 20. The probe beam 101 produced by the probe beam module 10 impinges on the sample surface 20 at a predetermined angle. Furthermore, the probe beam 101 can reach the sample surface 20 of interest directly, when the optical probe beam 101 is incident to the sample surface 20. In another implementation, the optical probe beam 101 can be incident on the back of the sample, and then transmits through the bulk of the sample to reach the sample surface 20. Moreover, the sample surface 20 can be specular to reflect the incident optical probe beam 101 like a mirror. In another implementation, the sample surface 20 can contain a grating to diffract the incident optical probe beam 101. The wavefront of the reflected or diffracted beams 201 is distorted by the sample surface 20, thus containing information about the instantaneous profile or out-of-plane and in-plane deformations of the sample surface.

Figure 1B:
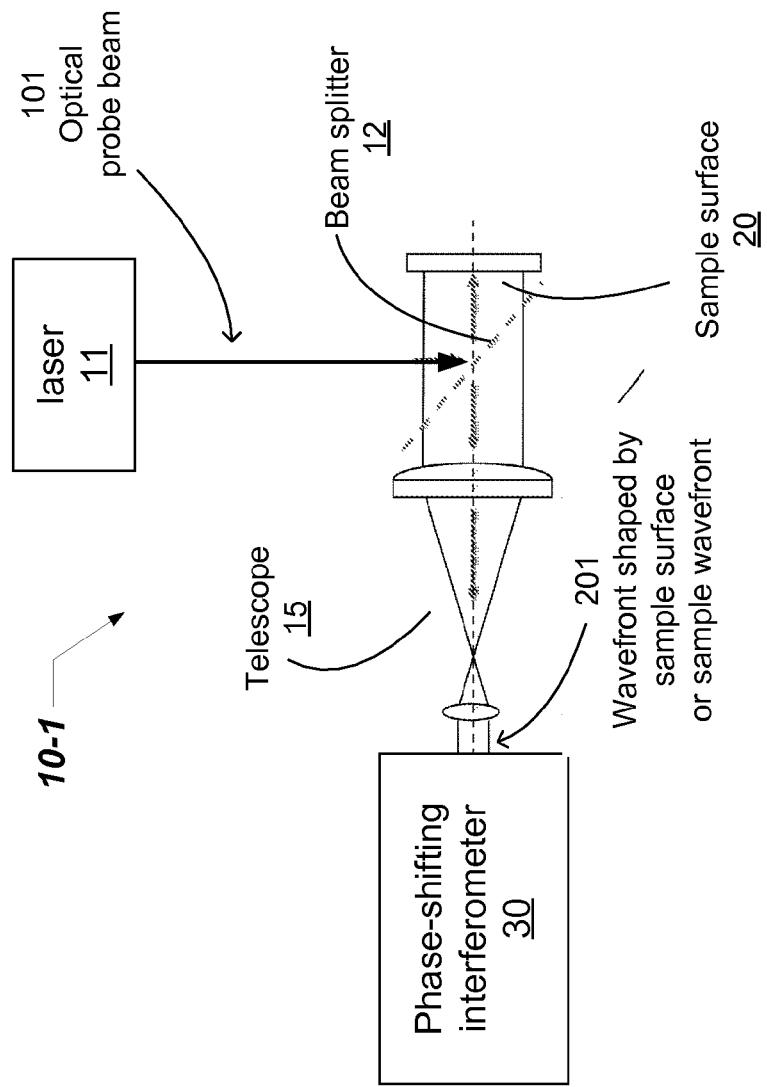
FIG. 1(b) illustrates an implementation of a probe beam module.

FIG. 1(b) shows an exemplary implementation of the optical beam module 10 and the sample surface 20. A laser 11 emits a collimated coherent probe beam 101. The optical probe beam 101 is directed by a beam splitter 12 to the sample surface 20 at normal incidence. The specular surface of the sample surface 20 reflects the optical probe beam 101 and forms a wavefront shaped by the sample surface 201. The wavefront of the reflected beam 201 contains information about the instantaneous profile or out-of-plane and in-plane deformations of the sample surface 20. The wavefront shaped by the sample surface 201 is also referred to as the distorted wavefront 201 or simply as the sample wavefront 201. A telescope 15 directs the wavefront shaped by the sample surface 201 into a phase shifting interferometer 30. The telescope 15 also matches the size of the distorted wavefront 201 to the entrance pupil of the phase shifting interferometer 30.

Figure 1C:
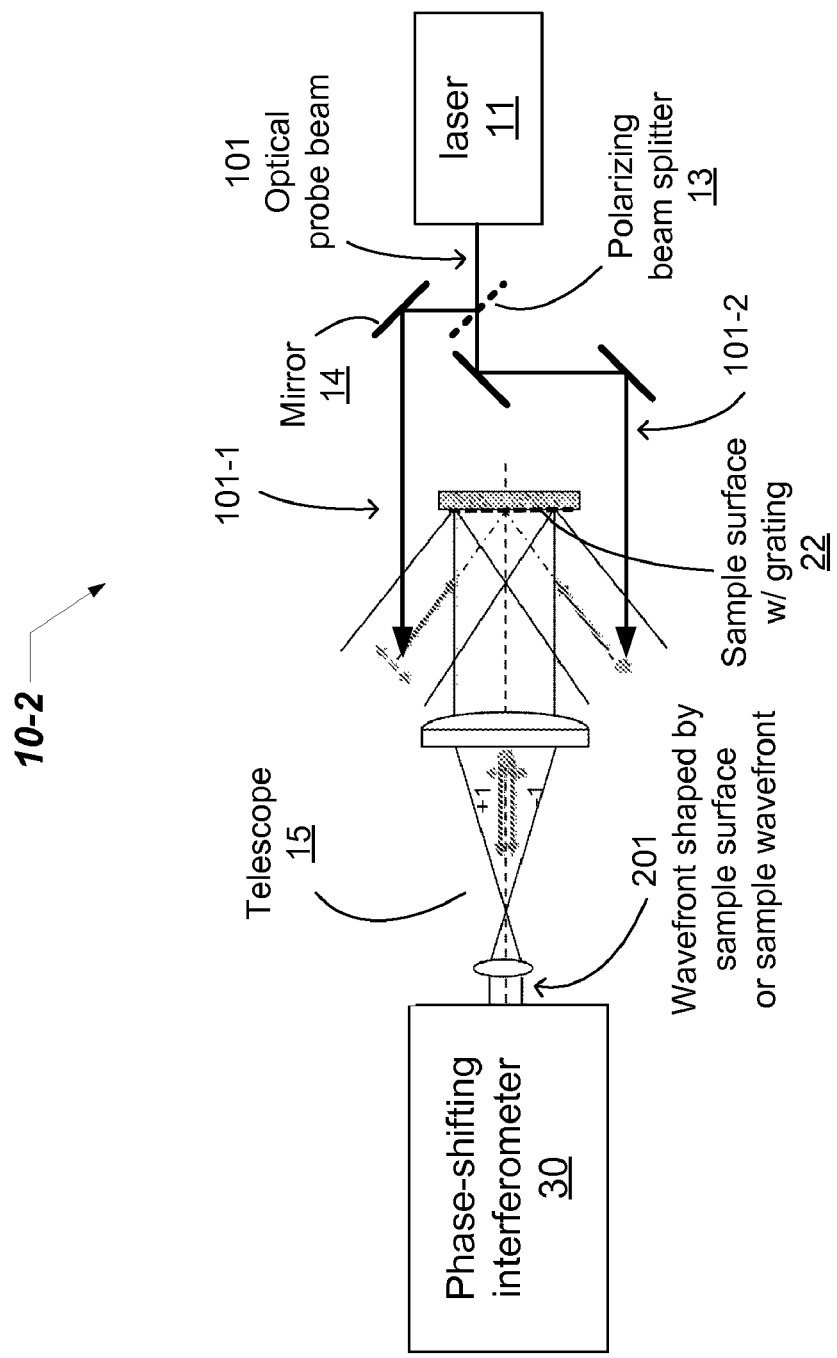
FIG. 1(c) illustrates another implementation of a probe beam module.

FIG. 1(c) shows another exemplary implementation of the optical beam module 10 and the sample surface 20. The laser 11 emits the collimated coherent probe beam 101. The optical probe beam 101 is split into linearly polarized probe beams 101-1 and 101-2 by a polarizing beam splitter 13. The polarization of the probe beams 101-1 and 101-2 are relatively orthogonal. Mirrors 14 direct the polarized probe beams 101-1 and 101-2 to the sample. The mirrors 14 are placed such that the optical path of the two probe beam arms are of equal length, thus preserving the temporal coherence between probe beams 101-1 and 102-1. In this implementation, the sample surface 22 contains a grating. The probe beams 101-1 and 101-2 are incident on the grating situated on the sample surface 22 such that the diffracted beams 201 are normal to the sample surface 22. The wavefront of the diffracted beam 201 is distorted and contains information about the instantaneous out-of-plane and in-plane deformations of the sample surface 20. In this implementation, the angle of incidence corresponds to a diffraction order +1 for probe beam 101-1 and −1 for probe beam 101-2. The angle of incidence θ obeys the grating relation:

$$d \sin \theta = \pm \lambda \quad (1)$$

The grating pitch on the sample surface is denoted d, and λ is the wavelength of the probe beam 101. In this exemplary implementation, the diffracted wavefronts 201 propagate along a common direction but do not interfere because the polarizations of the two diffracted wavefronts are orthogonal. Again the telescope 15 directs the wavefront shaped by the sample surface 201 into the phase shifting interferometer 30. The telescope 12 also matches the size of the distorted wavefront 201 to the entrance pupil of the phase shifting interferometer 30.

Returning to FIG. 1(a), the wavefront shaped by the sample surface 201 is directed to the phase shifting interferometer 30. The role of the phase shifting interferometer 30 is to combine the distorted wavefront 201 with a reference beam and to obtain phase shifted interferograms 301. In this application the phase shifting interferometer 30 can be a shearing interferometer. Shearing interferometry is a self-referenced interferometric technique, i.e., a sheared duplicate of the distorted front itself is used to cause interference, as explained below. Other types of phase shifting interferometers use distinct reference beams which interfere with the distorted beam.

The suitability of these interferometric techniques for optical measurements depends on the optical properties of the sample under measurement and the nature of the mechanics problems under investigation. The application of such techniques in deformation analysis often requires numerical differentiation of discretely-sampled displacement data which may introduce significant error magnification problems. In addition, many of these methods can be undesirably sensitive to rigid-body rotations and susceptible to ambient vibrations.

Wavefront shearing interferometry is an optical measurement technique for performing optical differentiations of wavefront phase by using self-referencing common-path interference between two laterally sheared wavefronts. A typical optical shearing interferometer produces and interferes two spatially shifted replicas of the same, usually distorted wavefront of an optical beam along a direction transverse to the direction of propagation of the wavefront. The interference between the spatially shifted and replicated wavefronts generates an interference pattern representing the spatial distribution of slopes in the wavefront. In effect, the shearing interferometry performs an optical differentiation of the wavefront and thus can be used to reduce the numerical differentiation of discretely-sampled displacement data and thus reduce errors associated with such numerical differentiation. Another feature of optical shearing interferomety is measurement of a deformation of one point of the wavefront to another of the same wavefront separated by the shearing distance, i.e., the distance between the two interfering replicas of the same wavefront. In this sense, an optical shearing interferometer is a self referencing interferometer and thus provides insensitivity or immunity to vibrations and other perturbations present at the wafer or device under measurement.

A shearing interferometer can be configured to produce a shearing interference pattern from either of the optical transmission of the probe beam through the surface or from the optical reflection of the probe beam by the surface. The shearing interference pattern is then processed to obtain surface, slopes, curvatures and other surface topographical information. Examples of measurable surfaces include but are not limited to surfaces in various panels and plates, various substrates and wafers, integrated electronic circuits, integrated optical devices, opto-electronic circuits, and micro-electromechanical systems (MEMS), flat panel display systems (e.g., LCD and plasma displays), photolithography masks, pellicles and reticles. Optical shearing interferometry can be implemented in various configurations, including a coherent gradient sensing (CGS) system using optical gratings to cause the shearing of the wavefront (see, e.g., U.S. Pat. No. 6,031, 611), a radial shear interferometers, wedge plate in a bi-lateral shearing interferometer (see, e.g., U.S. Pat. No. 5,710,631) and others.

Returning to the implementation based on the shearing interferometer, the distorted wavefront 201 interferes with the newly created sheared wavefront to obtain a first interferogram 301. An intensity pattern of dark and bright fringes representing the first interferogram 301 is acquired inside the phase shifting interferometer 30. To obtain the phase map corresponding to the distorted wavefront 201, three other distinct interferograms 301 have to be acquired. To produce distinct interferograms, a phase shifting mechanism inside the phase shifting interferometer 30 successively induces controlled phase shifts of the distorted wavefront, for example π/2, π and 3π/2.

Before explaining the phase shifting technique, the process of obtaining the shearing interferogram is revisited. Also the relationship between the phase map and the out-of-plane and in-plane deformations of the sample surface 20 is quantified.

Figure 1D:
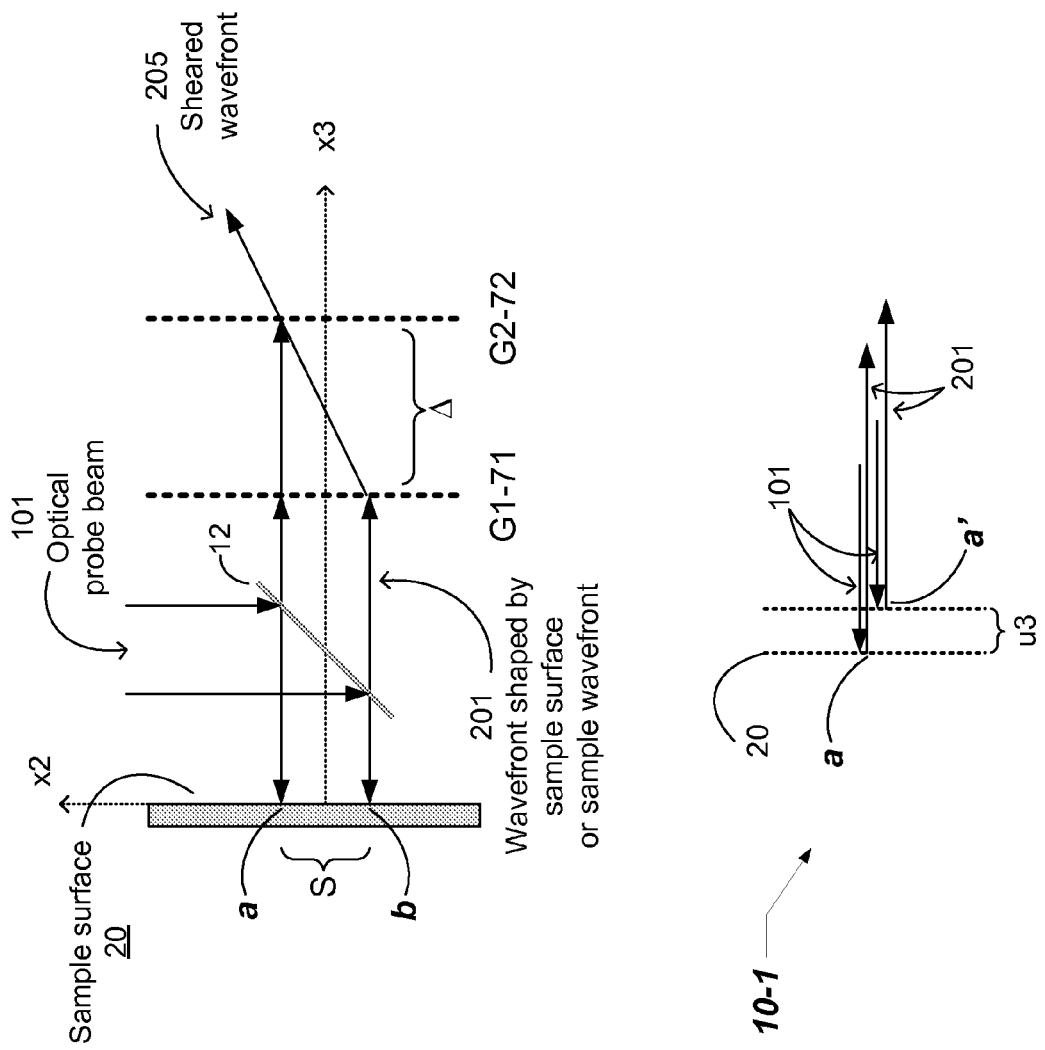
FIG. 1(d) illustrates operations of a shearing interferometer including two shearing gratings.

FIG. 1(d) illustrates how shearing elements inside the phase shifting interferometer 30 cause interference of the wavefront 201 shaped by the sample surface, when the distorted wavefront 201 is specularly reflected off the sample surface 20. A ray reflected normally from a point a on the sample surface 20 is transmitted through a first grating (G1) 71 of the shearing interferometer 30. The transmitted ray is then diffracted by a second grating (G2) 72. A second ray reflected normally from a neighboring point b at a distance S on the specimen surface is diffracted by G1 71 and transmitted through G2 72. Both rays then merge and propagate as a sheared wavefront 205 through the remainder of the phase shifting interferometer 30. Following this process, which can be extended to all points on the sample surface 20, two identical and laterally sheared wavefronts 205 interfere to create a fringe pattern 301 which corresponds to a displacement gradient map of the reflected optical wavefront 201.

For the sake of clarity and without any loss of generality, the case of a normally reflected beam in the plane (x2, x3) which is laterally sheared along the $x_2$ direction, as depicted in FIG. 1(d), is considered first. Results of the derivation are later extended to the beam propagating in the plane (x2, x3) and to the wavefront shearing, parallel to the $x_1$ direction.

As depicted in FIG. 1(d), the lateral shearing distance S is equivalent to the physical distance between two arbitrary neighboring points a and b, located on the specimen surface. From a ray optics perspective, two rays of light which originate at each of these points are merged after passing through the pair of parallel gratings in the phase shifting interferometer 30. The interference problem is analyzed by modeling the changes in optical path length which result due to the displacements of points a and b and the associated phase change at corresponding points on the laterally sheared interfering wavefronts. Since point a and point b represent arbitrary points on the sample surface, the optical path length descriptions apply to any pair of neighboring points on the specimen surface and the extension to full field solution naturally follows.

Neglecting all common path phase terms and coordinate scaling effects introduced by the imaging optics, the two laterally sheared, interfering wavefronts may be modeled as plane waves and expressed in a symmetric form in accordance with the coordinate description contained in FIG. 1(d):

$$E_a = E\left(x_1, x_2 + \frac{s_2}{2}, t\right) = A e^{i\{kx_3 - \omega t - \frac{2\pi}{\lambda}(\Delta S(x_1, x_2 + \frac{s_2}{2}, t))\}} \quad (2)$$

$$E_b = E\left(x_1, x_2 - \frac{s_2}{2}, t\right) = A e^{i\{kx_3 - \omega t - \frac{2\pi}{\lambda}(\Delta S(x_1, x_2 - \frac{s_2}{2}, t))\}} \quad (3)$$

Here, A represents the plane wave amplitudes, $k=2\pi/\lambda$ is the wave number, $x_3$ represents the propagation distance to the image plane, t represents time, and the phase factor $\Delta S(x1, x2+/-S2/2, t)$ represents changes in optical path length induced by the displacements which evolve over time at each of the neighboring points a and b which are separated by the lateral shearing distance $s_2$ along the $x_2$ direction.

The interference pattern is derived by taking the time averaged intensity of the combined plane wave fields given by $$\langle I \rangle \propto [E_a + E_b][E_a + E_b]^* \quad (4)$$

The symbol * denotes the complex conjugate operation, $E_a$ and $E_b$ represent the combining plane wave fields, and the optical constants of proportionality have been suppressed. Substituting for the interfering plane waves from (2) and (3) into (4) leads to the familiar two beam interference expression $$I(x_1, x_2, t) = \quad (5)$$
$$I_a + I_b + 2\sqrt{I_a I_b} \cos \frac{2\pi}{\lambda} \left[ \lim_{s \to 0} \left( \Delta S\left(x_1, x_2 + \frac{s_2}{2}, t\right) - \Delta S\left(x_1, x_2 - \frac{s_2}{2}, t\right) \right) \right]$$

The terms $I_a = E_a E_a$ and $I_b = E_b E_b$ represent the steady state background intensity of each interfering beam. Note that the time averaged intensity relation is expressed here as a limit due to the fact that the quantity $\langle I \rangle$ is actually a function of the optical information collected at neighboring points $$\left(x_1, x_2 - \frac{s_2}{2}\right) \text{ and } \left(x_1, x_2 + \frac{s_2}{2}\right)$$

and can therefore only approximate the intensity at the mid point $(x_1, x_2)$ in the limit that the shearing distance $s_2$ is made sufficiently small. The intensity of the resulting interferograms is modulated by a relative phase term $$|\Psi_{2,3}\rangle_{s2} = \lim_{s2 \to 0} \frac{2\pi}{\lambda} \left[ \Delta S\left(x_1, x_2 + \frac{s_2}{2}, t\right) - \Delta S\left(x_1, x_2 - \frac{s_2}{2}, t\right) \right] \quad (6)$$

The relative phase term is proportional to the relative changes in optical length between neighboring points a and b on the specimen surface and where the symbolic notation $|\Psi_{\alpha,3}\rangle_{s2}$ where $\alpha=1,2$ and $\beta=1,2$ is used in order to denote the wavefront shearing operation of the normally $(x\alpha, x3)$ wavefronts with respect to the x direction.

The inset 10-1 of FIG. 1(d) depicts how the optical path lengths of the normally diffracted wavefronts are altered as an arbitrary point a on the specimen surface shifts to a new location a' in the normal direction. A similar operation occurs to the displacements at the neighboring point b located at coordinate $$\left(x_1, x_2 - \frac{s_2}{2}, t\right).$$

Assuming that the optical path from the light source to the specimen is the same for every ray within an incident beam, the change of path length $(\Delta S)$ of a reflected ray at each neighboring point is given by $$\underbrace{\Delta S\left(x_1, x_2 + \frac{s_2}{2}, t\right)}_{\text{point } a} = 2u_3\left(x_1, x_2 + \frac{s_2}{2}, t\right) \quad (7)$$

$$\underbrace{\Delta S\left(x_1, x_2 + \frac{s_2}{2}, t\right)}_{\text{point } b} = 2u_3\left(x_1, x_2 - \frac{s_2}{2}, t\right) \quad (8)$$

Similar optical path length expressions apply for the (x1,x3) beam of neighboring points which are laterally displaced in the $x_2$ direction, and for pairs of neighboring points within beam, which are laterally displaced in the $x_1$ direction. Substituting the optical path length expressions (7-8) into (6) leads to an explicit form of the relative phase term given by $$|\Psi_{2,3}\rangle_{S2} = \lim_{s2 \to 0} \frac{4\pi}{\lambda}\left[u_3\left(x_1, x_2 + \frac{s_2}{2}, t\right) - u_3\left(x_1, x_2 - \frac{s_2}{2}, t\right)\right] \quad (9)$$

The intensity of the resulting interferograms is therefore modulated by relative differential displacements which take place between pairs of neighboring points on the specimen surface. If the shearing distance s is made to equal zero, then there are no optical path length differences between the interfering wavefronts and the interferometer is rendered completely insensitive. On the other hand ifs is too large, the interferometer will respond to differential displacements across a broad characteristic length on the specimen surface and fail to accurately capture local displacement gradient behavior. It is of interest to express lateral shearing in the limit where s approaches zero, yet remains finite, in order to accurately capture displacement field gradients, i.e out-of-plane slope maps, as a function of position on the specimen surface. Multiplying and dividing EQ. 9 by s2/s2 can be used to obtain an equivalent derivative form of the interferometer output as follows:

$$|\Phi_{2,3}\rangle_{S2} = \frac{4\pi}{\lambda}\frac{\partial u_3(x_1, x_2, t)}{\partial x_2} = \frac{|\Psi_{2,3}\rangle_{S2}}{S_2} \quad (10)$$

EQ. 10 symbolizes optical differentiation of the normally reflected (x2, x3) wavefronts with respect to the x2 direction. In practice, the actual interferometer phase output given in EQ. 9 is scaled by the factor $1/s_2$.

A similar lateral wavefront shearing operation can be applied to the spatial differentiation of the (x1, x3) beam pair along the same shearing direction x2. Also, lateral wavefront shearing of either reflected beam pair along the orthogonal x1 wavefront shearing direction can be considered. All four combinations can be summarized in a compact form as follows:

$$|\Phi_{\alpha,3}\rangle_{S\beta} = \frac{4\pi}{\lambda}\frac{\partial u_3(x_1, x_2, t)}{\partial x_\beta} = \frac{|\Psi_{\alpha,3}\rangle_{S\beta}}{S_\beta} \quad (11)$$

EQ. 11 denotes spatial differentiation of the normally diffracted (xα, x3) wavefronts with respect to xβ direction, where α=1,2 and β=1,2. Equation (11) therefore represents a total of four possible phase maps which can be obtained through the optical differentiation of normally reflected wavefronts. The form of EQ. 11 suggests that the out-of-plane displacement gradient maps may be achieved extracting whole field phase information from each laterally sheared diffracted wavefront. Wavefront shearing along other off-axis directions can also be performed.

Figure 1E:
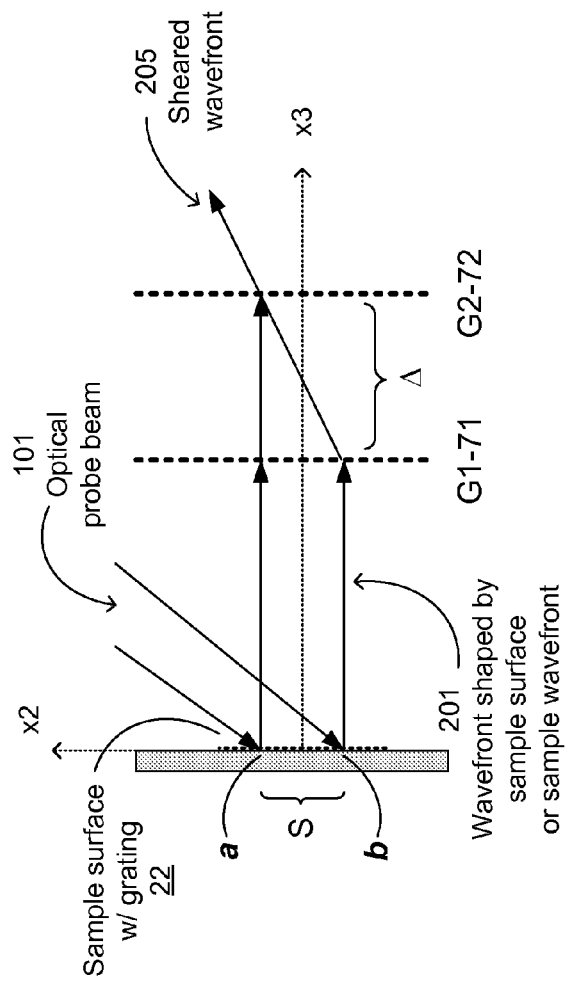
FIG. 1(e) illustrates other operations of a shearing interferometer including two shearing gratings.
Figure 1E:
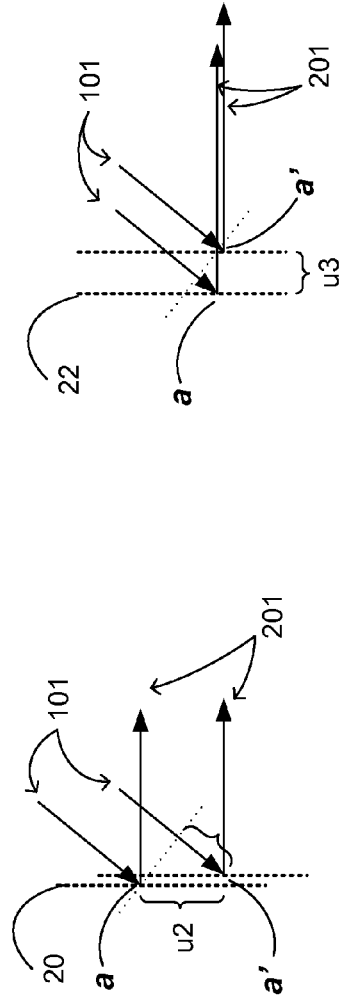

Turning to FIG. 1(e), the interference of the distorted wavefront 201 after diffraction off the grating on the sample surface 22 is revisited. A ray diffracted normally from a point a on the sample surface 22 is transmitted through a first grating (G1) 71 of the shearing interferometer 30. The transmitted ray is then diffracted by a second grating (G2) 72. A second ray diffracted normally from a neighboring point b at a distance S on the specimen surface is diffracted at G1 71 and transmitted through G2 72. Both rays then merge and propagate as a sheared wavefront 205 through the remainder of the phase shifting interferometer 30. Following this process, which can be extended to all points on the sample surface 20, two identical and laterally sheared wavefronts 205 interfere to create a fringe pattern 301 which corresponds to a displacement gradient map of the reflected optical wavefront 201.

As depicted in FIG. 1(e), the lateral shearing distance S is equivalent to the physical distance between two arbitrary neighboring points a and b, located on the specimen surface. From a ray optics perspective, two rays of light which originate at each of these points are merged after passing through the pair of parallel gratings in the phase shifting interferometer 30. The interference problem is analyzed by modeling the changes in optical path length which result due to the displacements of points a and b and the associated phase change at corresponding points on the laterally sheared interfering wavefronts. Since point a and point b represent arbitrary points on the sample surface, the optical path length descriptions apply to any pair of neighboring points on the specimen surface and the extension to full field solution naturally follows.

The derivation of EQ. 2-6 corresponding to the implementation illustrated in FIG. 1(d) also applies to the probe beam implementation depicted in FIG. 1(e). Therefore in analogy to EQ. 6, the intensity of the resulting interferograms is modulated by a relative term given by $$|\Psi_{2,3}^{+/-}\rangle_{s_2} = \lim_{s_2 \to 0} \frac{2\pi}{\lambda}\left[\Delta S\left(x_1, x_2 + \frac{s_2}{2}, t\right) - \Delta S\left(x_1, x_2 - \frac{s_2}{2}, t\right)\right] \quad (12)$$

The relative phase term is proportional to the relative changes in optical length between neighboring points a and b on the specimen surface and where the symbolic notation $|\Psi_{\alpha,3}\rangle_{s\beta}$ where α=1,2 and β=1,2 is used in order to denote the wavefront shearing operation of the normally diffracted (xα,x3) wavefronts with respect to the $x_\beta$ direction.

The inset 10-2 of FIG. 1(e) depicts how the optical path lengths of the normally diffracted wavefronts are altered as an arbitrary point a on the specimen surface shifts to a new location a' in the transverse direction and a" in the normal direction. A similar operation occurs to the displacements at the neighboring point b located at coordinate $$\left(x_1, x_2 - \frac{s_2}{2}, t\right).$$

Assuming that the optical path from the light source to the specimen is the same for every ray within an incident beam, the change of path length (ΔS) of a reflected ray at each neighboring point is given by $$\underbrace{\Delta S\left(x_1, x_2 + \frac{s_2}{2}, t\right)}_{\text{point } a} = \quad (13)$$

$$u_3\left(x_1, x_2 + \frac{s_2}{2}, t\right)[1 + \cos\Theta] \pm \left(u_2\left(x_1, x_2 + \frac{s_2}{2}, t\right)\sin\Theta\right)$$

$$\underbrace{\Delta S\left(x_1, x_2 - \frac{s_2}{2}, t\right)}_{\text{point } b} = \quad (14)$$

$$u_3\left(x_1, x_2 - \frac{s_2}{2}, t\right)[1 + \cos\Theta] \pm \left(u_2\left(x_1, x_2 - \frac{s_2}{2}, t\right)\sin\Theta\right)$$

The ±symbols correspond to the individual m=±1 diffracted orders which comprise the (x2, x3) beam pair. Similar optical path length expressions apply for the (x1, x3) beam pair with pairs of neighboring points which are laterally displaced in the $x_2$ direction, and for pairs of neighboring points within either beam pair, which are laterally displaced in the $x_1$ direction. Substituting the optical path length expressions (13-14) into (12) leads to an explicit form of the relative phase term given by $$|\Psi_{2,3}^{+/-}\rangle_{s_2} = \qquad (15)$$
$$\lim_{s_2 \to 0} \frac{2\pi}{\lambda} \{(u_3(x_1, x_2 + \frac{s_2}{2}, t) - u_3(x_1, x_2 - \frac{s_2}{2}, t))(1 + \cos\Theta) \pm$$
$$(u_2(x_1, x_2 + \frac{s_2}{2}, t) - u_2(x_1, x_2 - \frac{s_2}{2}, t))\sin\Theta\}$$

Again the ± symbols correspond to the respective m=±1 diffracted orders and also reflect the fact that the symmetrically diffracted wavefronts experience equal and opposite phase changes in response to a given transverse displacement.

The intensity of the resulting interferograms is therefore modulated by a linear combination of relative differential displacements which take place between pairs of neighboring points on the specimen surface. As discussed above, it is of interest to perform lateral shearing in the limit where s approaches zero, yet remains finite, in order to accurately capture displacement field gradients, i.e out-of-plane slope maps and in-plane strain fields, as a function of position on the specimen surface. Multiplying and dividing EQ. 15 by $s\beta/s\beta$ leads to an equivalent derivative form of the interferometer output as follows:

$$\left|\Phi_{2,3}^{+/-}\right\rangle_{s_2} = \frac{2\pi}{\lambda} \left\{ \left(\frac{\partial u_3(x_1, x_2, t)}{\partial x_2}\right)(1 + \cos\Theta) \pm \qquad (16)\right.$$
$$= \left(\frac{\partial u_2(x_1, x_2, t)}{\partial x_2}\right)\sin\Theta\right\}$$
$$= \frac{1}{s_\beta} \left|\Psi_{2,3}^{+/-}\right\rangle_{s_2}$$

EQ. 16 expresses optical differentiation of the normally diffracted ($u_\alpha, u_3$) wavefronts with respect to the $x_\beta$ direction where $\beta$=1,2. In practice, the actual interferometer phase output $|\Psi_{\alpha,3}^{+/-}\rangle_{s_\beta}$ is scaled by the factor of $$\frac{1}{s_\beta}.$$

Similar lateral wavefront shearing operation can be applied to the spatial differentiation of the (x1, x3) beam pair along the same shearing direction. Also, lateral wavefront shearing of either diffracted beam pair along the orthogonal $x_1$ wavefront shearing direction can be considered. All four shearing combinations may be summarized in a compact form as follows:

$$\left|\Phi_{\alpha,3}^{+/-}\right\rangle_{s_\beta} = \frac{2\pi}{\lambda} \left\{ \left(\frac{\partial u_3(x_1, x_2, t)}{\partial x_\beta}\right)(1 + \cos\Theta) \pm \qquad (17)\right.$$
$$= \left(\frac{\partial u_\alpha(x_1, x_2, t)}{\partial x_\beta}\right)\sin\Theta\right\}$$
$$= \frac{1}{s_\beta} \left|\Psi_{\alpha,3}^{+/-}\right\rangle_{s_\beta}$$

EQ. 17 summarizes spatial differentiation of the normally diffracted ($u_\alpha, u_3$) wavefronts with respect to the $x_\beta$ direction where $\alpha$=1,2 and $\beta$=1,2. Equation (17) therefore represents a total of eight possible phase maps which can be obtained through the optical differentiation of normally diffracted wavefronts. The form of EQ. 17 suggests that decoupling of the in-plane and out-of-plane displacement gradient terms may be achieved through the addition or subtraction of symmetric m=±1 phase terms, provided that a suitable procedure is available for extracting whole field phase information from each laterally sheared diffracted wavefront. Wavefront shearing along other off-axis directions can also be performed.

Phase shifting techniques can be used to extract whole field phase information contained within generated interference patterns. In quasi-static testing applications, phase shifting of the individual laterally sheared diffracted wavefronts and their associated interferograms may be executed in a sequential fashion. Under dynamic test conditions however, where the phase front evolves rapidly in time, instantaneous phase shifting schemes can be used to simultaneously capture all of the phase-shifted interferograms as expressed by EQs. 11 or 17 without any significant time lag between measurements. Several such dynamic phase shifting schemes are presented in future sections of this application.

Phase shifting may be implemented to progressively adjust the phase separation between the two shifted interfering wavefronts which cycles or manipulates fringe position on the specimen's surface under measurement. In one implementation, a shearing interferometer may be configured to obtain multiple phased images of a patterned wafer's surface, for example at 0, 90, 180, and 270 degrees in phase. The phase shifting method allows for the wavefront slope to be measured by calculating the "relative phase" modulation at each pixel on a detector array that receives the interference pattern. The phase shifting method also allows for consistent interpretation of wavefront and specimen slope on a surface that exhibits changing reflectivity, like those found on patterned wafers. On a patterned wafer surface, each pixel location on the specimen may reflect light with a varying degree of intensity relative to other pixel locations. This may complicate the interpretation of any single shearing interferogram. The phase shifting method in shearing interferometry can simultaneously increase the accuracy of the slope resolution and allow for accurate interpretation of interferograms on patterned surfaces with a spatially varying optical reflectivity. This is possible in part because the relative phase of each pixel or location within the shearing interfering pattern rather than merely the variation in the fringe intensity is measured.

One property of the shearing interferometry due to its self-referencing nature is that the resulting shearing interference pattern essentially measures the deviations from flatness of the surface under measurement by using the surface itself as a reference surface. Such relative data on surface height or flatness may be useful in various applications where the height or flatness of a surface is monitored or controlled. For example, in a chemical mechanical polishing (CMP) process or other surface polishing processes, the relative height across the surface may be monitored to determine the effectiveness of the polishing process. A shearing interferometer may be used to monitor the surface flatness and the measurements may be used to dynamically control the polishing condition of the polishing process in real time.

In some implementations, the shearing distance between the transversely shifted wavefronts that interfere with each other may be adjusted during the measurement process to improve the resolution and accuracy of the data. By capturing interferometric images of the surface at multiple increments of shearing distances, it is possible to resolve features smaller than the effective pixel size of the camera or imaging sensing array being used to sample the interferometric data. In addition, as described later in this application, the use of multiple shearing distances enables the highly accurate calculation of the estimated surface topography or nanotopography from the relative data by a geometric calculation rather than a standard numerical integration algorithm to compute the actual surface profile.

Figure 2A:
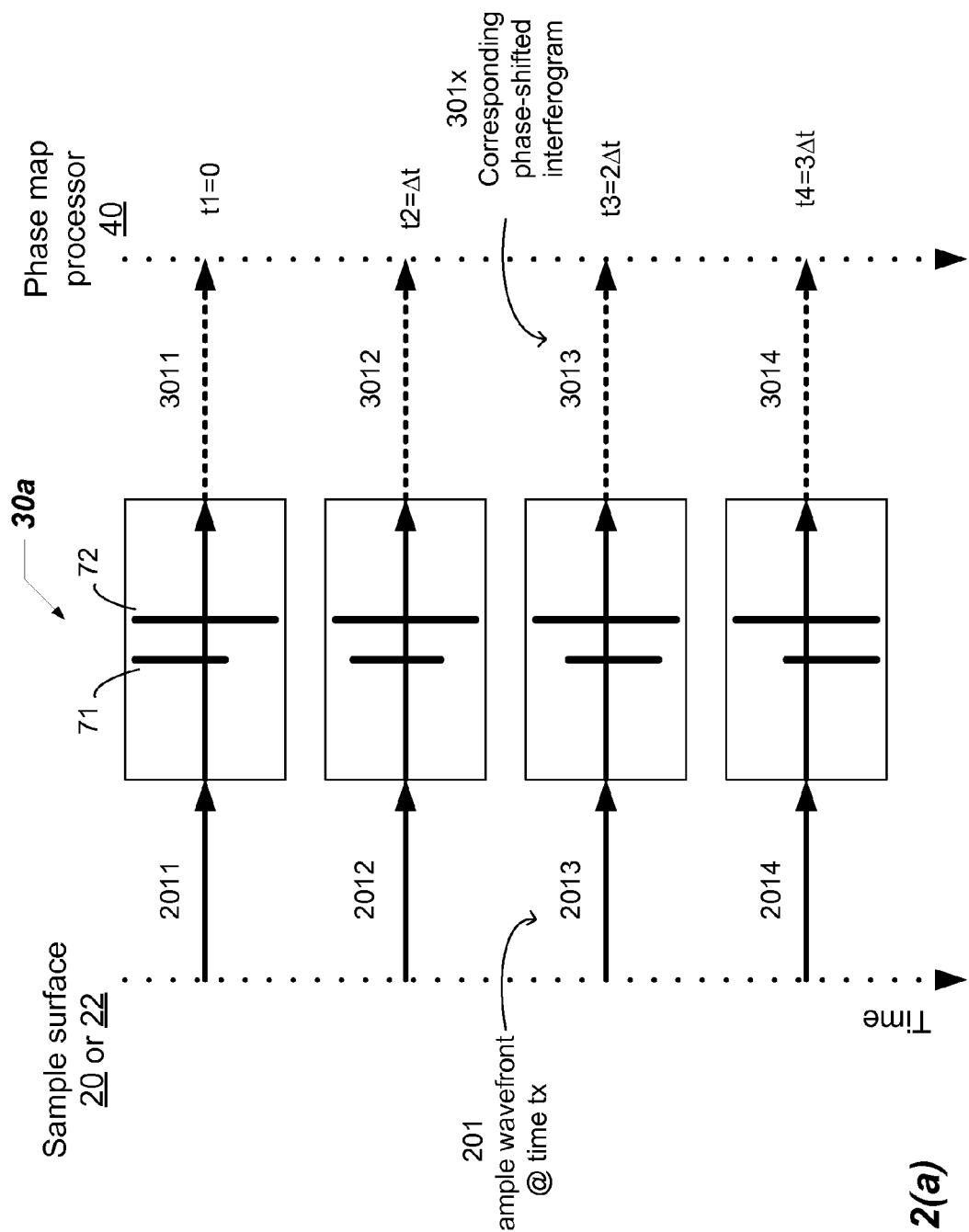
FIG. 2(a) illustrates phase shifting operations of a shearing interferometer including two shearing gratings.

The phase shifting operation of a shearing interferometer 30, including a phase shifting element based on two gratings, is presented in the format of a swim-lane diagram 30a in FIG. 2(a). The swim-lane diagram 30a depicts in the left lane the sample surface 20 (see FIGS. 1b and 1d) or the sample surface 22 including a grating (see FIGS. 1c and 1e). The swim-lane diagram 30a depicts in the right lane a phase map processor 40 (also depicted in FIG. 1a). The center lane of the swim-lane diagram 40a contains the shearing interferometer 30, including the shearing gratings 71 and 72. The time flows in the vertical direction, such that early times are depicted at the top, and later times at the bottom of the swim-lane diagram 30a. Therefore each horizontal level of the swim-lane diagram 30a represents an instant of time. The distorted wavefronts 201x travel from the sample surface 20 (or 22), from left to right, to the phase shifting interferometer 30. The interferograms 301x produced by the phase shifting interferometer 30 are being passed, from left to right, to the phase map processor 40.

At time t1=0 a wavefront 2011 shaped by the sample surface is being sheared by the shearing interferometer 30. Note that the distorted wavefront 2011 contains information about the state of the sample surface 20 (or 22) at this time t1. Also, at this initial time, the relative position of the two gratings 71 and 72 is set to a certain value. Once the interferogram 3011 has been acquired and passed to the phase map processor 40 for later processing, the phase shifting interferometer is ready to induce a control phase shift of the distorted wavefront.

The relative position of gratings 71 and 72 can be modified in the transverse plane defined by directions x1 and x2 while maintaining the spacing between the two gratings 71 and 72 along the x3 direction fixed. A positioning mechanism, such as a precise translation stage or a positioning transducer, can be used to implement this adjustment of the relative position between the gratings for phase shifting. At least one lateral position controller may be engaged to one of the two gratings to cause the lateral change in position. Two lateral position controllers may be respectively engaged to the two gratings to cause the phase shift. In this implementation, the two gratings may be maintained to be parallel to each other with the fixed spacing during the lateral movement. Multiple shearing interference patterns with different lateral relative positions between the gratings can be obtained for further processing with phase extraction and unwrapping algorithms.

At time t2, a time interval Δt later than t1, a wavefront 2012 shaped by the sample surface is being sheared by the shearing interferometer 30. The grating 71 is translated relative to the fixed grating 72, such that the relative phase between the interferograms 3012 and 3011 induced by this translation equals π/2. If the pitch of the gratings 71 and 72 is p, then the lateral shift which induces a phase shift of π/2 is p/4. A full 2π phase shift (which is equivalent to no phase shift) is induced if the grating 71 were translated by a full pitch p. Fractions of the phase period (2π) are obtained by translating the grating 71 over corresponding fractions of the full pitch p. In the implementation described in FIG. 2(a), the fractional phase shift is π/2, a quarter of 2π, corresponding to a grating translation of a quarter of the full pitch p.

The time interval Δt to produce the phase shift is finite (not zero) because it takes a finite amount of time to engage the translation stage, translate the grating 71, and disengage the translation stage. During the time interval between t1 and t2 the sample surface 20 (or 22) may have remained unchanged, under static testing conditions (say, on a vibration isolation table). But, under dynamic testing conditions (say, on a shaker table, etc.) the state of the sample surface 20 at time t1 may be different from the state of the sample surface 20 at time t2. Therefore, the wavefront 2012, that is being phase shifted and sheared at t2, may carry different information about the sample surface 20 at time t2 then the wavefront 2011 did at t1<t2.

At time t3, a time interval Δt later than t2, the grating 71 is once again translated relative to the fixed grating 72, such that the relative phase between the interferograms 3013 and 3012 is incremented by π/2. A lateral translation of grating 71 equal to p/4 causes again the desired relative phase shift of π/2. The wavefront 2013 is phase shifted and sheared at t3 to obtain the phase shifted interferogram 3013.

Finally, at time t4, a time interval Δt later than t3, the grating 71 is once again translated relative to the fixed grating 72, such that the relative phase between the interferograms 3014 and 3013 is incremented by π/2. Again a lateral translation of grating 71 equal to p/4 is needed to cause the desired relative phase shift of π/2. The wavefront 2014 is phase shifted and sheared at t4 to obtain the phase shifted interferogram 3014.

The interferograms 301x acquired sequentially in the swim-lane diagram 30a of FIG. 2(a) can be summarized in the equation $$I_j(x_1, x_2, t_j) = I_m + I_a \cos(\Phi(x_1, x_2, t_j) + (j-1)\frac{\pi}{2}) \qquad (18)$$

The index j=1-4. The term $I_m$ represents an average (background) intensity, while the factor $I_a$ represents the modulation amplitude of the fringe pattern. As depicted in the swim-lane diagram 30a of FIG. 2(a), the phase Φ(x1, x2, tj) distribution which modulates the phase shifted interferograms $I_j$(x1, x2, tj) 301 has been acquired at four successive times. The techniques, apparatus and systems described later in this application allow for the simultaneous acquisition of four phase shifted interferograms Ij 301, such that the system of equations (18) can be solved for an instantaneous phase map 401 Φ(x1, x2, t), at time t.

Returning to FIG. 1(a), the phase map 401 Φ(x1, x2, t) is obtained by the phase map processor 40. The system of four linear equations (18) has the following four unknowns: $I_a$, $I_m$, sin Φ and cos Φ. The phase map 401 Φ(x1, x2, <t>) 401 is found in terms of the four previously acquired phase shifted interferograms Ij(x1, x2, tj) 301:

$$\Phi(x_1, x_2, \langle t \rangle) = \tan^{-1}\left(\frac{I_2(x_1, x_2, t_2) - I_4(x_1, x_2, t_4)}{I_1(x_1, x_2, t_1) - I_3(x_1, x_2, t_3)}\right) \qquad (19)$$

Note that because each phase shifted interferogram Ij(x1, x2, tj) 301 is acquired at a different time tj, the phase map 401 represents a temporal average<t> of the sample surface 20 during the time interval from t1 to t4.

Finally, the obtained phase map 401 is further processed by a surface map processor 50. Once the phase-shifted interferograms Ij(x1, x2, tj) 301 have been unwrapped, the surface profile or the slope map and the strain map can be obtained by processing EQs. 11 and 17. The interpretation of raw slope maps and the derivation of curvature may be enhanced by statistically fitting a surface polynomial to the raw slope data. Statistical surface fits, including Zernicke polynomials and Legendre polynomials, may be applied to raw slope data derived from, for example, patterned wafers for the purpose of deriving topography (or nanotopography) and curvature data.

The method 200 illustrated in FIG. 2(b) summarizes the process of temporal (or sequential) phase shifting shearing interferometry. At step 220, a wavefront shaped by the sample surface is obtained. It was shown in regard to FIGS. 1(b)-1(e) that there are several ways to obtain the distorted wavefront, for example through reflection, transmission, or diffraction of the sample surface.

A set of four interferograms is sequentially acquired during the next steps. Therefore, a looping counter j and a time counter tj are initialized next.

At step 230, a phase shift of π/2 with respect to the previous distorted wavefront phase is induced by the phase shifting interferometer. It was shown in regard to FIG. 2(a) that a quadrature phase shift is obtained through a relative lateral translation of a quarter pitch between the two shearing gratings of the shearing interferometer.

At step 231, a lateral shear of the phase shifted wavefront is induced by the shearing gratings, as shown in FIGS. 1(d)-(e). The orientation of the grating lines determine the shearing direction, namely along the x1 or x2 axes.

At step 232 an interferogram of the sheared wavefront is obtained. The fringe pattern is modulated by the phase of the distorted wavefront at the time of the measurement. Note that steps 230-231 have been segregated for the sake of clarity, but in fact they occur simultaneously. Namely, the relative lateral displacement of the two shearing gratings induces the desired phase shift. The relative distance between the two shearing gratings determines the lateral shear (differentiation of the wavefront shaped by the sample surface). Finally, the interferogram is acquired for a certain relative position of the two shearing gratings.

To return to the beginning of the loop, at node A, the loop counter is initialized. Also the time counter is incremented by a time interval Δt corresponding to the time needed to translate laterally one of the shearing gratings. The relative lateral translation determines the success of the subsequent phase shifting step 230.

At the end of the loop, at output step 235, the set of four acquired interferograms is passed to the phase map computation module. At step 240 the phase map corresponding to the wavefront shaped by the sample surface is obtained using EQ. 19. The calculation of the phase map is based on the assumption that the sample surface does not change on the time scale 3Δt that it takes for subsequent phase shifts to occur. Equivalently, the phase map corresponds to a sample surface shape time-averaged over the time required to acquire the four phase shifted interferograms. The following sections present techniques, apparatus and systems to enable real-time phase shifting measurements using a shearing interferometer.

Figure 3:
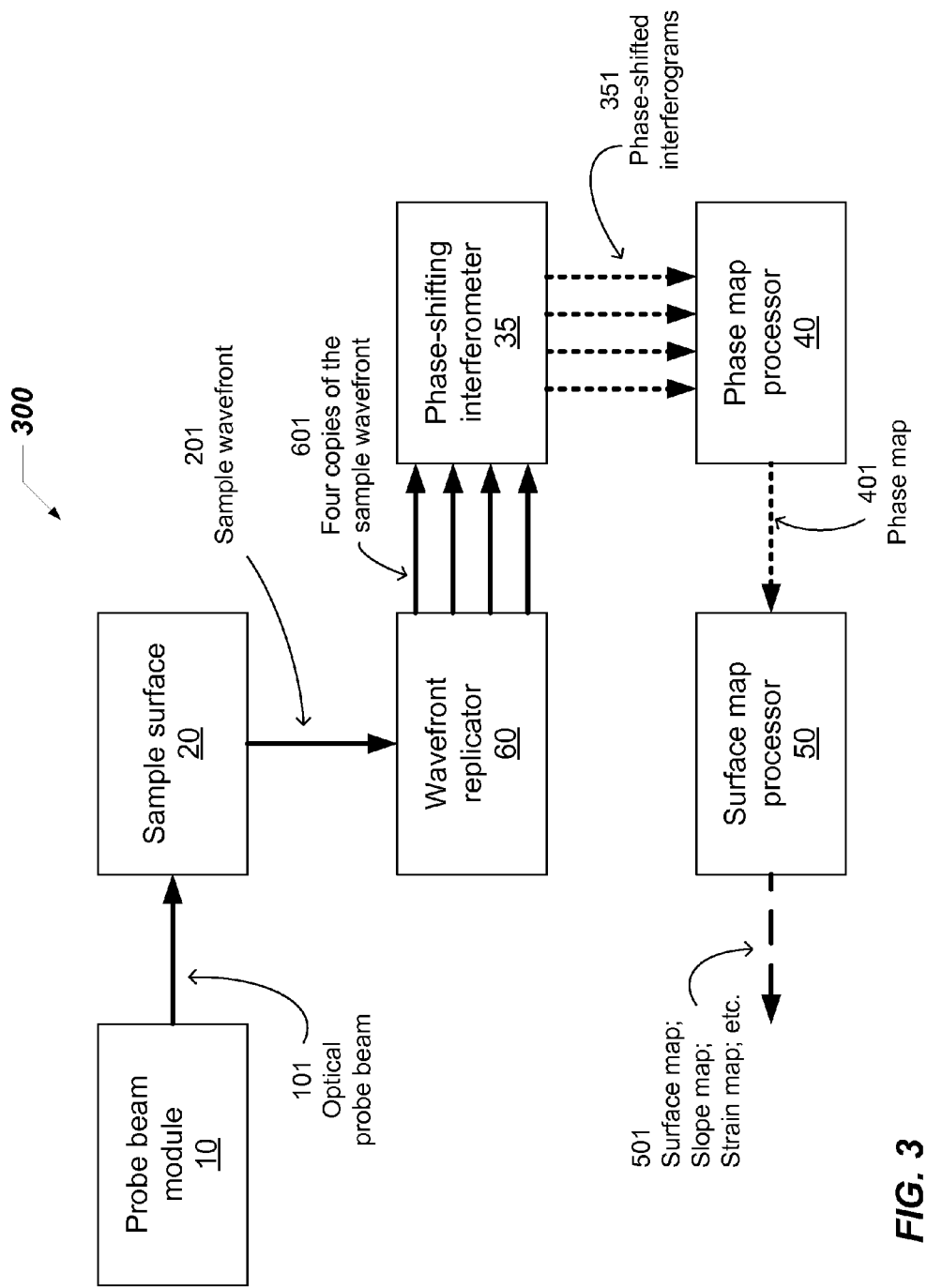
FIG. 3 shows an exemplary system including a real-time phase shifting interferometer for obtaining instantaneous whole field mapping of various parameters of a sample surface.

FIG. 3 illustrates diagrammatically a system 300 which uses a phase shifting interferometer to obtain a real-time (one-shot) profile (elevation map), slope (out-of-plain distortions) and strain (in-plain distortions) of a sample surface. Each block of the diagram represents a functional module and can contain multiple components as indicated in subsequent sections. Each arrow connecting the diagram blocks represents the output of the prior block and the input of the subsequent block, respectively.

The front end of system 300, namely the probe beam module 10 and the sample surface module 20 have been described in detail with regard to system 100 presented in FIG. 1(a). Namely, the probe beam module 10 prepares a coherent and collimated probe beam 101. Block 20 represents the surface of the sample of interest. As shown in FIGS. 1(b-e), the sample surface can specularly reflect or diffract the probe beam 101, depending on the sample surface preparation. The wavefront 201 shaped by the sample surface carries phase information that maps the shape, slope or strain of the sample surface.

At the back end of system 300, the phase map processor 40 receives phase shifted interferograms 351 from the phase shifting interferometer 35 and obtains the phase map 401 corresponding to the sample surface 20. The phase map calculation is based on the method described above and summarized in EQ. 19. Once the phase map 401 is obtained, the surface map module 50 extracts information related to the profile or out-of-plane and in-plane displacements of the sample surface 20. This information can be presented in terms of surface parameter maps 501, for example, surface profile map, slope map, strain map, etc.

It was shown above that within the framework of system 100, the phase shifting interferometer 30 can produce one phase shifted interferogram 301 at a time. In contrast, the phase shifting interferometer 35 in system 300 generates four phase shifted interferograms 351 at one time instance (in one shot). The operation principle of the instantaneous phase shifting interferometry and the optical components which make the technique possible are described below.

A system module relied upon in the operation of system 300 is a wavefront replicator module 60. The role of the wavefront replicator module 60 is to receive the wavefront 201 shaped by the sample surface and to generate four identical copies 601 of the wavefront.

Figure 4A:
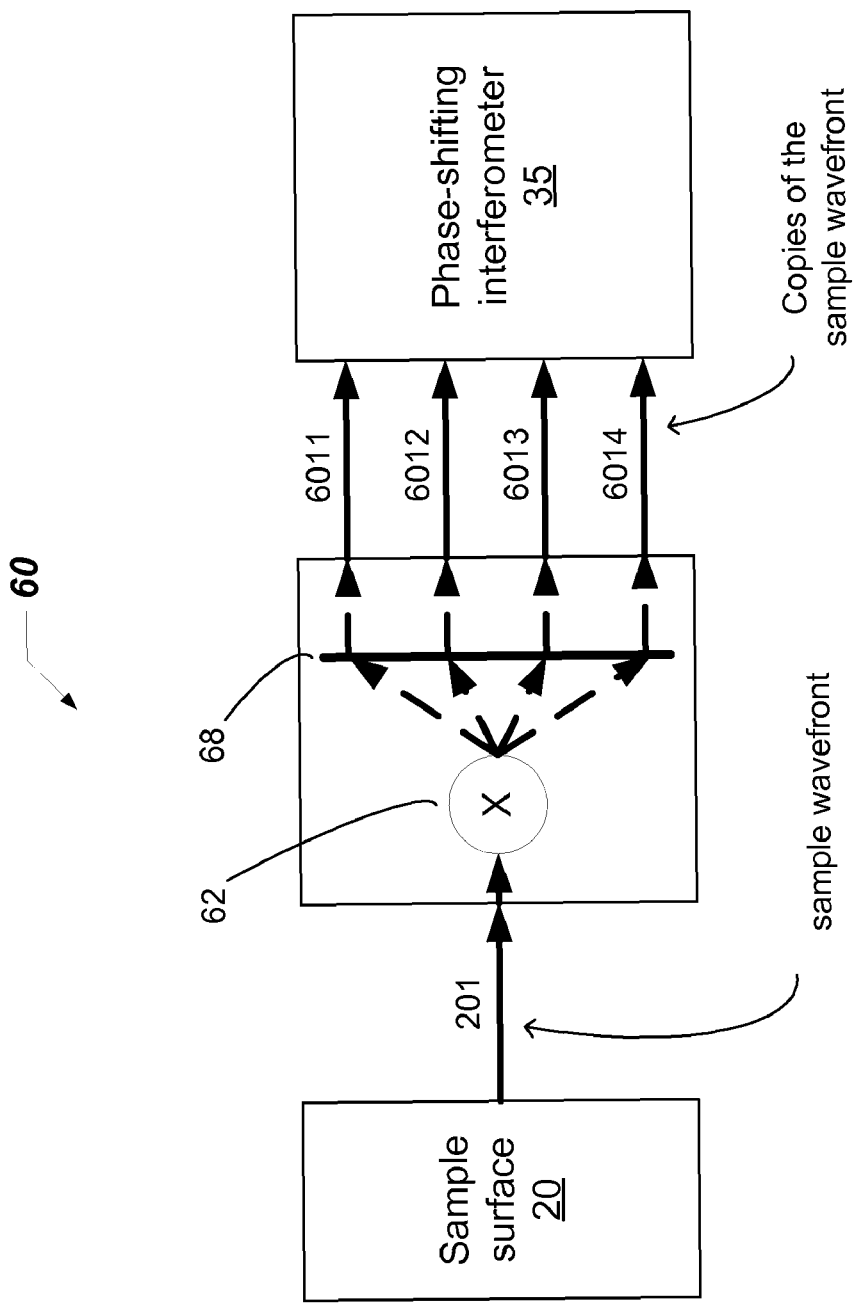
FIG. 4(a) illustrates a diagram of a wavefront replicator module.

FIG. 4(a) shows a high level diagram of the wavefront replicator module 60. A detailed description of the wavefront replicator module 60 is presented in regard to FIGS. 6-8. Returning to FIG. 4(a), the input of the wavefront replicator module 60 is the wavefront 201 shaped by the sample surface, and the output of the wavefront replicator module 60 is a set of four copies 6011-6014 of the wavefront shaped by the sample surface. The wavefront replicator module 60 includes a first optical element 62 configured to split the incoming wavefront 201 shaped by the sample surface into four wavefronts. The incoming wavefront 201 shaped by the sample surface enters the wavefront replicator module 60 parallel to the optical axis. The resulting four wavefronts emerging from the first optical element 62 diverge from the optical axis. A second optical element 68 downstream from the first optical element 62 is configured to capture the diverging wavefronts. Further, the second optical element directs the four copies 6011-6014 of the wavefront to the output of the wavefront replicator module 60 along a direction parallel to the optical axis.

Figure 4B:
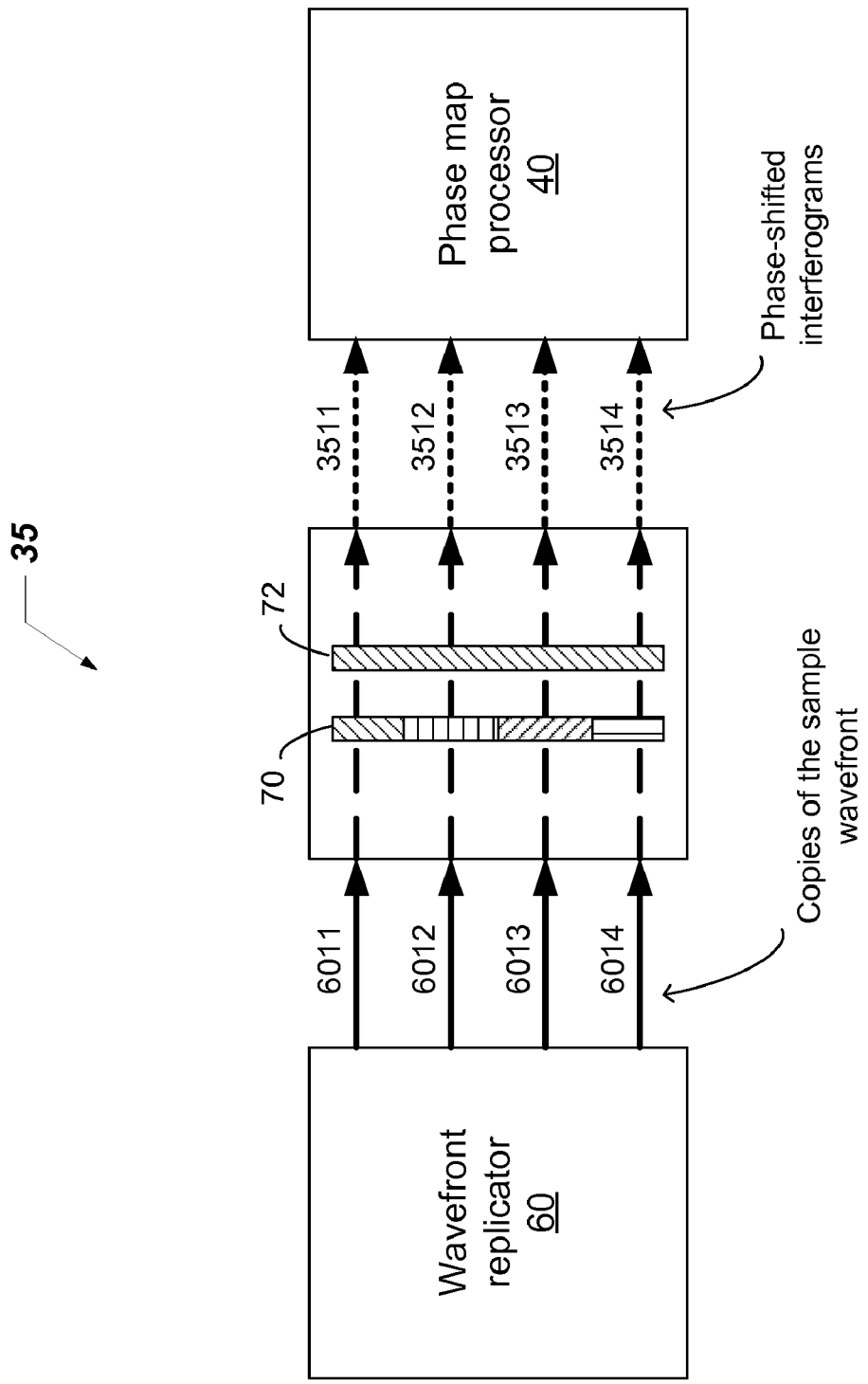
FIG. 4(b) illustrates a diagram of a four channel shearing interferometer with integrated phase shifting capability.

FIG. 4(b) shows a high level diagram of the shearing phase shifting interferometer 35. A detailed description of the shearing phase shifting interferometer 35 is presented in regard to FIGS. 5(a)-(b). Returning to FIG. 4(b), the input of the shearing phase shifting interferometer 35 is the set of four copies 6011-6014 of the wavefront shaped by the sample surface, and the output of the shearing phase shifting interferometer 35 is a set of four real-time phase shifted interferograms 3511-3514. The shearing phase shifting interferometer 35 includes a phase shifting pair of optical elements 70 and 72. The first optical element 70 includes a custom grating which includes four spatially distinct areas. Each area is configured to capture one (and only one) of the four copies 6011-6014 of the wavefront shaped by the sample surface. Furthermore, each of the areas is configured to induce a quadrature phase shift to the respective incident copy 601 of the wavefront relative to the other wavefronts. The relative phase shifts are imparted simultaneously to all four copies 6011-6014 of the wavefront shaped by the sample surface. The four phase shifted wavefronts traverse the grating 72 downstream from the optical element 70. Thus the four phase shifted wavefronts are sheared by the grating 72 to obtain four real-time phase shifted interferograms 3511-3514.

Figure 4C:
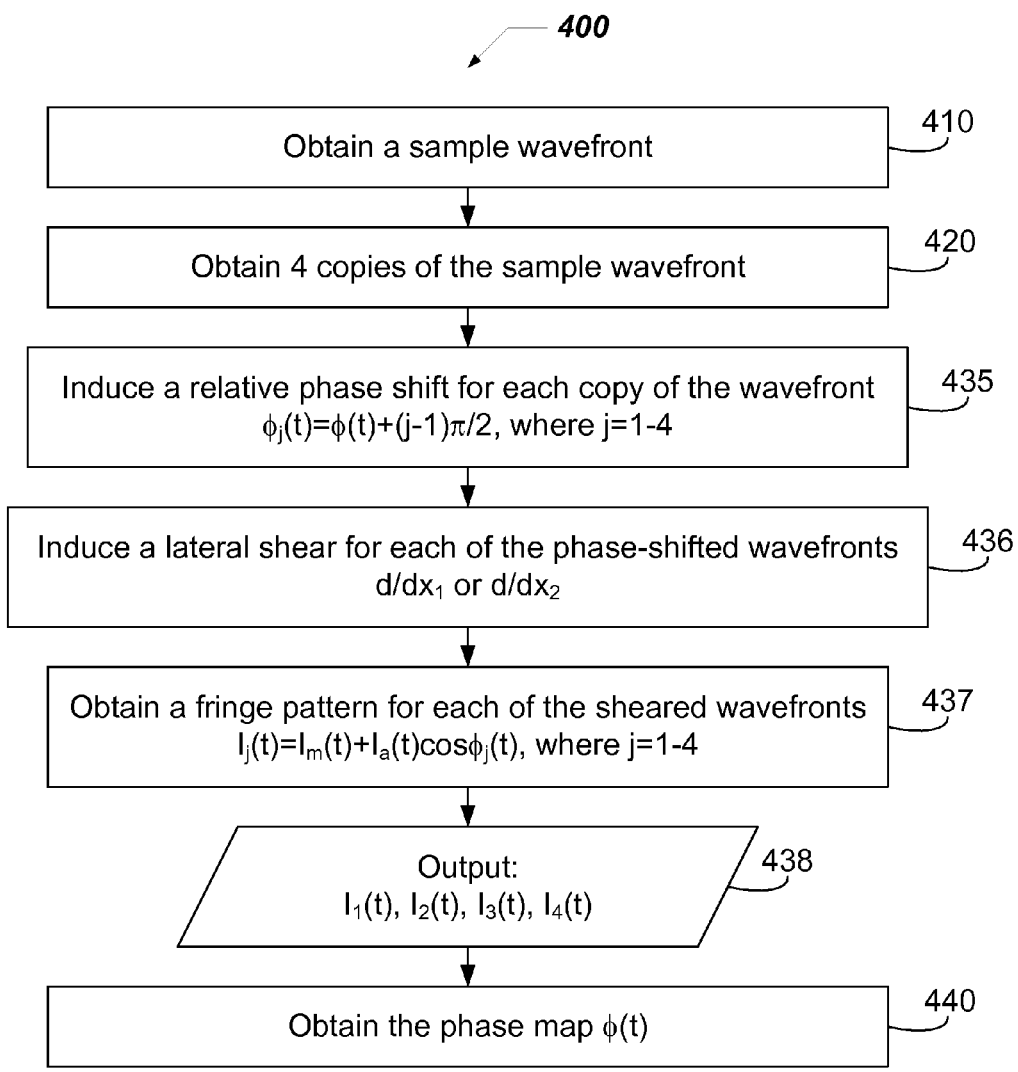
FIG. 4(c) shows an exemplary method based on real-time phase shifting interferometry for obtaining instantaneous whole field phase mapping of a sample surface.

FIG. 4(c) presents a method 400 to operate the system 300 illustrated in FIG. 3. The method 400 describes the acquisition of real-time (one shot) phase shifted interferograms to obtain the instantaneous phase map corresponding to a sample surface. Once the instantaneous phase map is available, multiple surface parameter maps can be extracted, such as surface profile map, out-of-plane and in-plane displacement maps, etc.

At step 410, a wavefront shaped by the sample surface is obtained. It was shown in regard to FIGS. 1(b)-1(e) that there are several ways to obtain the distorted wavefront, for example through reflection or diffraction of the sample surface.

At step 420, four copies of the wavefront shaped by the sample surface are obtained. The availability of the four copies allows for the simultaneous phase shifting of the original wavefront shaped by the sample surface.

At step 435, relative phase shifts of $\pi/2$ with respect to each other, for each copy of the distorted wavefront phase, are induced simultaneously.

$$\Phi_j(x_1, x_2, t) = \Phi(x_1, x_2, t) + (j-1)\frac{\pi}{2} \quad (20)$$

The index j=1-4. Note that each of the four shifted phases corresponds to the same time t.

At step 436, a lateral shear of the four phase shifted wavefronts is simultaneously induced by the shearing gratings. The orientation of the grating lines determine the shearing direction, namely along the x1 or x2 axes.

At step 437 four fringe pattern of the sheared wavefronts are obtained. The interferograms are modulated by the phase of the distorted wavefront at the time of the measurement.

$$I_j(x_1, x_2, t) = I_m + I_a \cos(\Phi(x_1, x_2, t) + (j-1)\frac{\pi}{2}) \quad (21)$$

The index j=1-4. Once again, each of the four shifted interferograms corresponds to the same time t.

Note that steps 435-437 have been separated for the sake of clarity, but in fact they occur simultaneously. Namely, the relative lateral position between areas of the two shearing elements induces the desired set of phase shifts. The relative distance between the two shearing elements determines the lateral shear (differentiation of the wavefront shaped by the sample surface). Finally, the interferograms are acquired as the four copies of the wavefront shaped by the sample surface traverses the two shearing elements.

At output step 438, the set of four acquired real-time interferograms is passed to the phase map computation module. At step 440 the phase map corresponding to the wavefront shaped by the sample surface is obtained by solving the system of equations 21. The four unknowns are Ia, Im, sin $\Phi$ and cos $\Phi$. The phase map $\Phi(x1, x2, t)$ 401 is found in terms of the four simultaneously acquired phase shifted interferograms Ij(x1, x2, t). The four real-time phase shifted interferograms determine the phase map based on the formula:

$$\Phi(x_1, x_2, t) = \tan^{-1}\left(\frac{I_2(x_1, x_2, t) - I_4(x_1, x_2, t)}{I_1(x_1, x_2, t) - I_3(x_1, x_2, t)}\right) \quad (22)$$

Because the phase shifted interferograms Ij(x1, x2, t) have been acquired at the same time t, the phase map corresponds to the shape of the sample surface 20 at the given time t. In contrast, the phase map obtained through successive phase shifting, using system 100 and summarized in EQ. 19, represents a time-averaged state of the sample surface.

The following sections present various implementation of system 300 and method 400 to enable real-time phase shifting measurements. For the remainder of this application, the term real-time phase shifting is used interchangeably with one-shot phase shifting or spatial phase shifting.

Figure 5A:
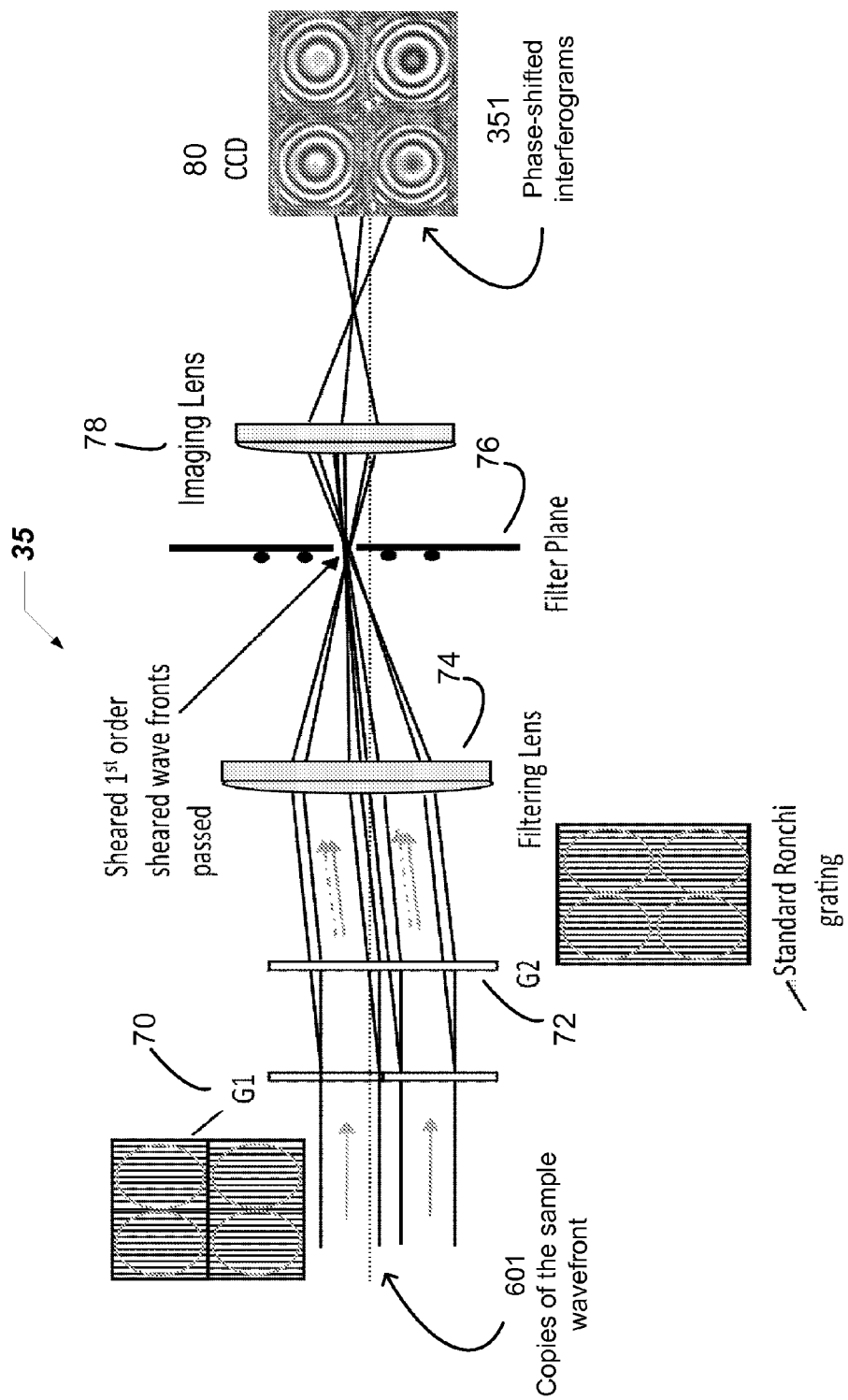
FIG. 5(a) illustrates an exemplary implementation of a four channel shearing interferometer with integrated real-time phase shifting capability.
Figure 5B:
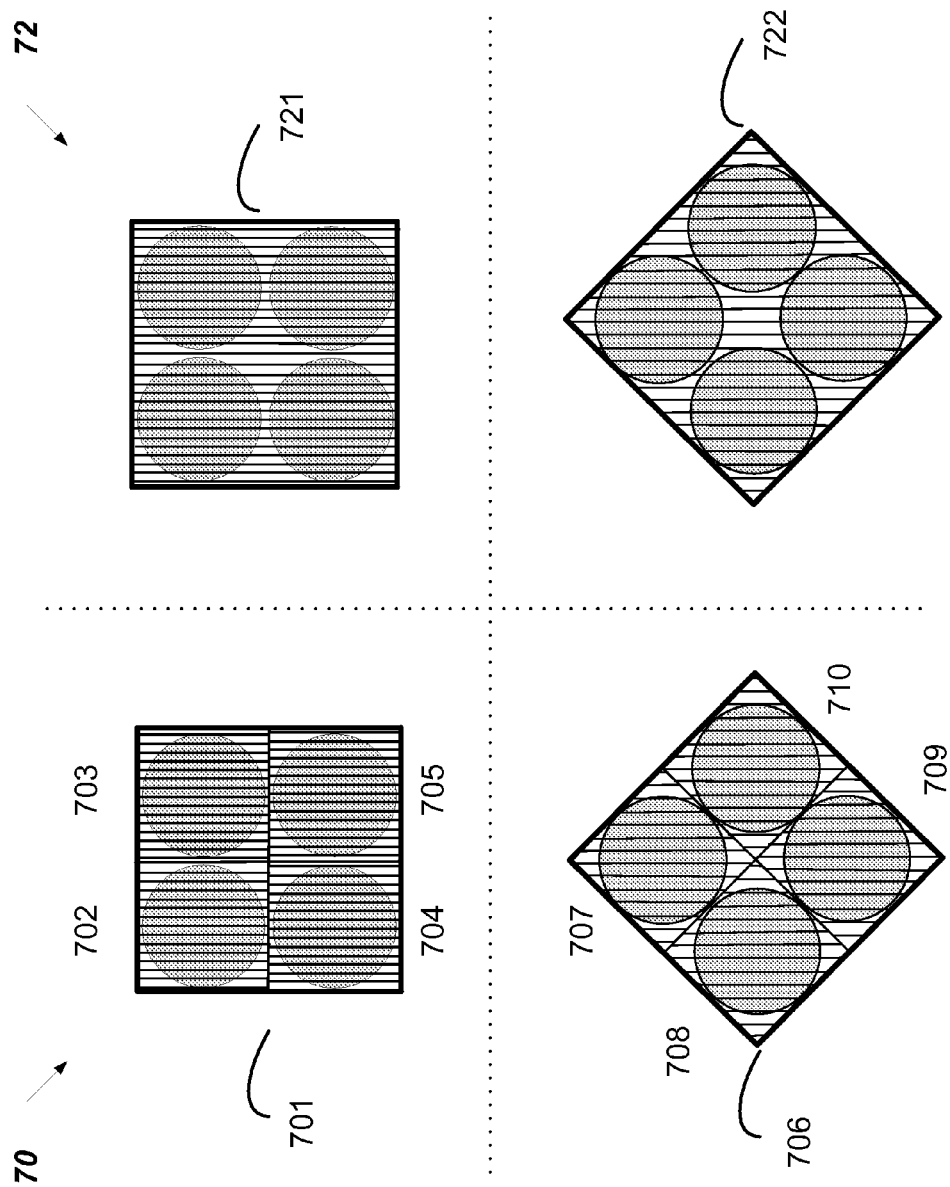
FIG. 5(b) illustrates exemplary components of a four channel shearing interferometer with integrated phase shifting capability.

FIG. 5(a) illustrates schematically a shearing interferometer 35 configured to perform real-time phase shifting. The implementation shown in FIG. 5(a) is only one of many other types of real-time phase shifting interferometers that can be used to operate the system 300 in FIG. 3. Examples of other interferometric techniques which could be configured for real time operation are Twyman-Green or Moire interferometers. In one exemplary implementation, the optical module 35 presented in FIG. 5(a) is a four-channel shearing interferometer with integrated spatial phase shifting capability. The interferometer 35 illustrated in FIG. 5(a) includes phase shifting elements, shearing elements, spatial filtering elements and imaging elements, as described below.

The four-channel shearing interferometer with integrated spatial phase shifting capability 35 receives four copies 6011-6014 of the wavefront shaped by the sample surface from a wavefront replicator module 60. Several implementations of the wavefront replication module 60 are described in later sections. The optical element 70 at the input of the four-channel shearing interferometer with integrated spatial phase shifting capability 35 includes four Ronchi gratings arranged in a square mosaic arrangement as shown in greater detail in FIG. 5(b).

The gratings 702-705 or 707-710 in each adjacent quadrant of the mosaic configurations 701 or 706 are out of step by a distance equal to ¼ of the Ronchi grating's fundamental pitch. As discussed previously, the quarter pitch translation between adjacent gratings results in a $\pi/2$ relative phase shift between the four copies 6011-6014 of the wavefront shaped by the sample surface. The four gratings can be unattached, but supported in the assemblies 701 or respectively 706 in FIG. 5(b). Furthermore, the four gratings can be integrated into a component 701 or a component 706 (in contrast to the respective assemblies of unattached gratings). The orientation 701 or 706 of the optical element 70 depends on whether the distribution of the incoming four beams 601 is a square (701) or a diamond (702) with respect to the optical axis.

The second optical element 72 placed downstream from the first optical element 70 is a Ronchi grating. The ruling of the second Ronchi grating 72 is uniform, with the same fundamental pitch as the Ronchi gratings of element 70. The orientation 721 or 722 of the second optical element 72 matches the respective orientation 701 or 706 of the first optical element 70.

The four copies 6011-6014 of the wavefront shaped by the sample surface are directed to intercept a specific quadrant of element 70. The Ronchi grating which is part of that quadrant diffracts the respective copy 601 of the wavefront. Wavefront shearing takes place once the diffracted beams that emerge from element 70 are re-diffracted by grating 72.

Returning to FIG. 5(*a*), the four sheared 1st order beams that emerge from grating 72 are focused by a filtering lens 74 and passed through a small hole in an opaque screen 76 that acts as a filter plane. Thus, other unwanted diffraction orders created by the tandem gratings 70 and 72 are blocked out by the spatial filtering elements 74 and 76.

Each sheared beam is then imaged to a specific quadrant of a camera sensor 80 by an imaging lens 78. The resulting interference patterns 3511-3514 exhibit a relative phase shift of $\pi/2$ radians due to the ¼ pitch offset between the gratings in each adjacent quadrant of element 70 with respect to the constant uninterrupted pitch of grating 72. In another implementation the four phase-shifted interferograms 351 may be captured by four separate cameras.

The acquired interferograms 351 are stripped into four subset images by the camera 80, then post processed by modules 50 and 60 of the system 300, as shown in FIG. 3. As discussed previously, the post-processing calculation includes a four-step $\pi/2$ phase shifting algorithm summarized by EQ. 22, to yield whole field plots of surface slope and strain fields, in accordance with EQs. 11 and 17.

The next section provides a detailed description of a wavefront replicator module 60 used to generate four copies 601 of the original wavefront and to direct them to the four-channel shearing interferometer 35. The wavefront replicator module 60 includes beam splitting elements, spatial filtering and imaging elements, and beam steering elements, as described below.

Figure 6:
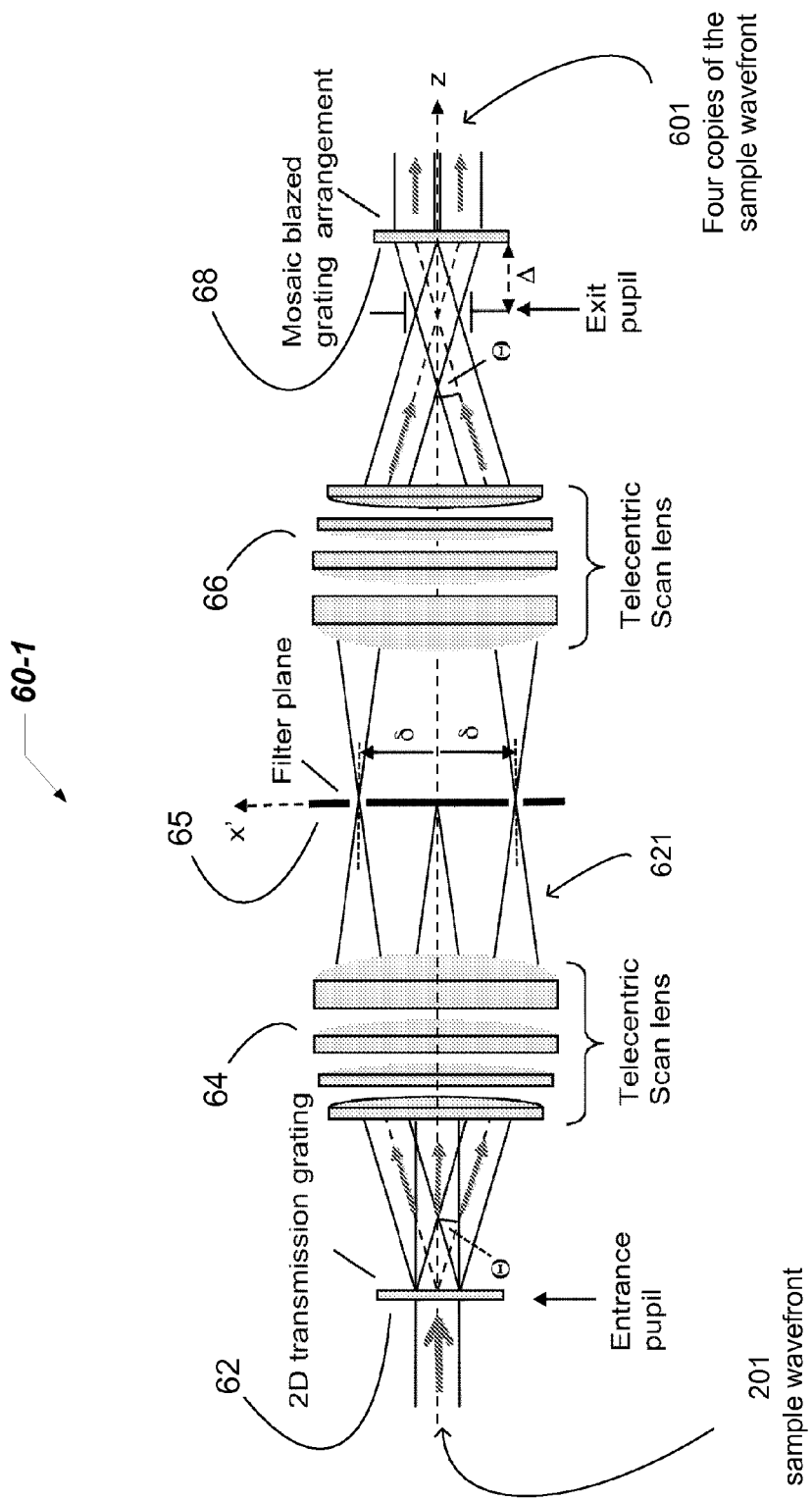
FIG. 6 illustrates an exemplary implementation of a wavefront replicator module.

FIG. 6 illustrates an exemplary implementation of the wavefront replicator module 60-1 [60]. A nominally collimated beam probe beam 101 is diffracted, reflected, or transmitted by a test specimen 20, and the wavefront 201 shaped by the sample surface is directed towards the entrance pupil of the wavefront replicator module 60-1 [60] parallel to the optical axis. In another exemplary implementation, before reaching the wavefront replicator module 60-1 [60], the wavefront 201 shaped by the sample surface is passed through a telescope in order to reduce the overall beam diameter.

Figure 7:
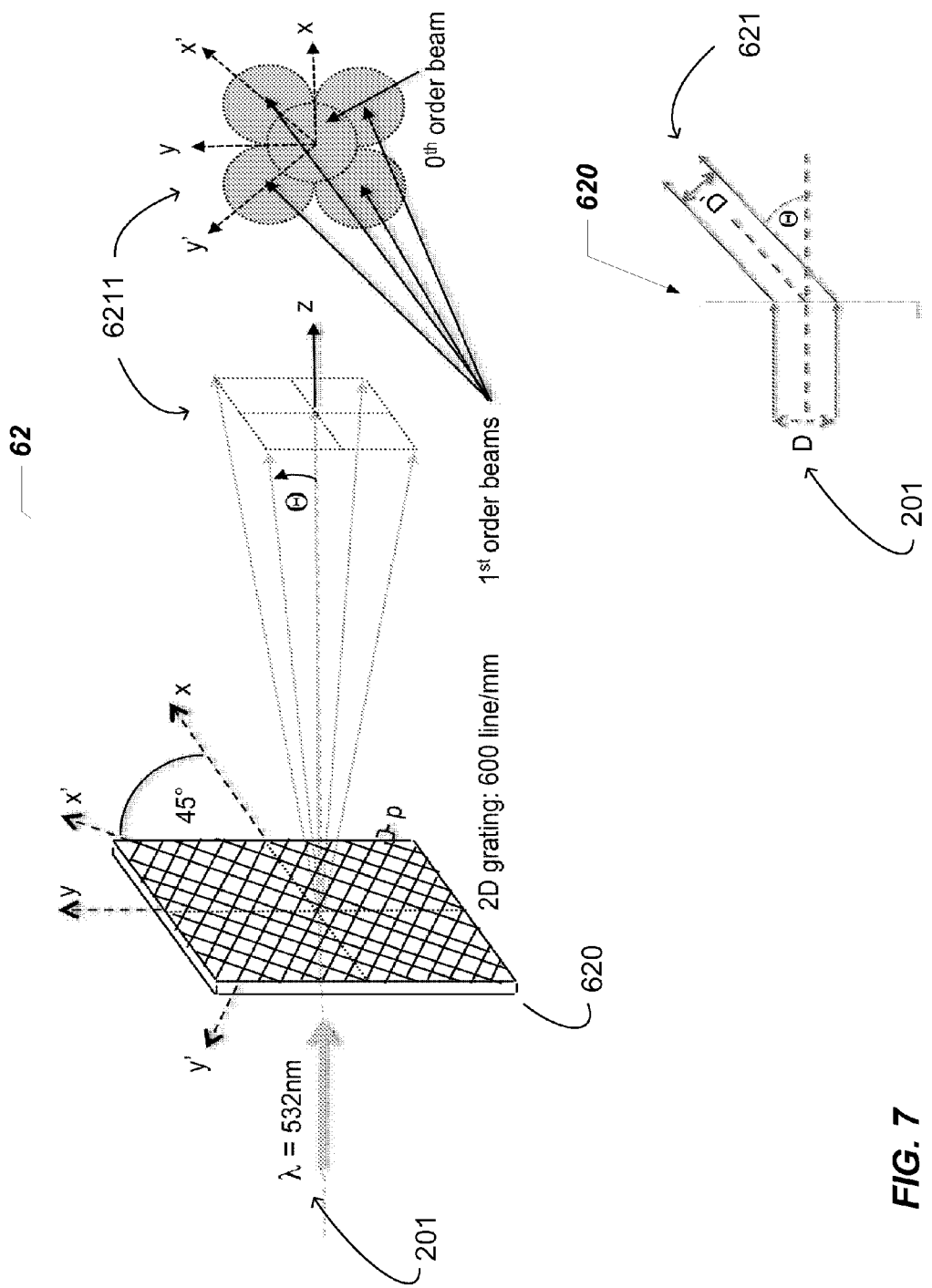
FIG. 7 illustrates an exemplary implementation of a beam splitter element.

A two dimensional (2D) or crossed line transmission grating 62 situated at the entrance pupil of the wavefront replicator module 60-1 [60] diffracts the incident beam 201 to create four equal intensity 1st order diffracted beams. FIG. 7 shows a more detailed diagram of the 2D grating 62 and the four copies of the diffracted wavefront 621, which carry identical information about the specimen's state of deformation.

A normally incident and nominally collimated beam of light 201 emerging from a test specimen 20 is diffracted into a symmetric array of sharp diffraction orders using the 2D transmission grating 62. As shown in FIG. 7, the grating 620 is oriented at 45deg with respect to the x-y axes in order to project the resulting diffraction pattern 621 into a rectangular array about the optical (z) axis. Numerous diffraction orders associated with the fundamental grating pitch (p) arise in accordance with the general grating equation given by $$\theta = \sin^{-1}\left(\frac{m\lambda}{p}\right) \qquad (23)$$

The order of diffraction m (0, +/−1, +/−2, . . . ) related to a specific diffraction order of interest, and X represents the laser wavelength. The four symmetrically oriented diffraction orders 621 depicted in FIG. 7 represent the primary beams of interest. The combination of 532 nm laser wavelength and a diffraction grating line pair frequency of 600 line/mm results in a 1st order diffraction angle $\theta = 19°$.

The 2D grating 62 can be tuned to maximize the amount of energy that is diffracted into m=+/−1 orders while balancing a nearly equal intensity distribution between these beams. First order beams have been generated which posses 10% of the incident beam intensity (collectively equal to 40% of the original intensity).

Two aspects regarding the use of a 2D transmission grating as a beam splitter in the wavefront replicator module 60-1 are addressed below. The first effect is the presence of the unavoidable 0th order beam along with all of the higher diffraction orders that are generated by the 2D grating. Theses beams are unwanted from the perspective of the overall spatial phase shifting objective because the unwanted beams may interfere with the 1st order beams. Suppression of undesired diffraction orders is achieved through the implementation of a spatial filtering arrangement, which is addressed next.

The second effect concerns a one-dimensional (anamorphic) reduction of the beam diameter that results along the direction running parallel to the plane of diffraction. The anamorphic reduction of a diffracted beam diameter is illustrated in the inset 620 of FIG. 7. The ratio of the diffracted beam 621 diameter to the original beam 201 diameter is given by $$m = \frac{D'}{D} = \cos\theta \qquad (24)$$

In the case of a 600 line/mm grating 62 and a 532 nm laser wavelength, the anamorphic effect results in a 1st order beam 621 diameter which has shrunk to ~95% of the incident beam 201 diameter. Each of the four primary 1st order beams will thus experience a similar reduction in beam diameter along a uniquely different direction lying parallel to its respective diffraction plane. The anamorphic effect, if unaccounted for, introduces pixel misregistration between the four phase shifted fringe patterns 351 when combined together to solve for the phase front using EQ. 22. As discussed below, the design of the wavefront replicator 60 mitigates the anamorphic effect. Namely the anamorphic effect is precisely nullified (reversed) with the introduction of a mosaic blazed grating arrangement 68, which is used as the final beam steering element in the four-channel design, as discussed below.

Returning to FIG. 6, the elimination of the unwanted diffraction orders is addressed first. The four 1st order beams 621 are focused by a telecentric f-theta lens 64 and passed through small holes in an opaque screen 65 situated at the focal plane. The opaque screen blocks the 0th order beam as shown in addition to any other unwanted diffraction orders generated by the 2D grating 62.

The separation distance between the focused beams at the rear focal plane 65 is given by δ=f*tan θ, where f is the effective focal length of the scan lens and θ is the diffraction angle. Commercially available telecentric scan lenses can be used for this focusing application since they are designed to deliver diffraction limited performance at the 532 nm laser wavelength in a nearly identical optical configuration. For example, a telecentric scan lens, with a focal length f=100 mm and an overall scanning range of +/−22° accommodates the anticipated 1st order diffraction angles θ=+/−18° while the nominal focal length (f=100 mm) induces a physical separation of δ=34 mm between the focused $0^{th}$ and 1st order beams at the filter plane. The lens 64 also serves as a low pass filter because the lens 64 cannot accept any higher order beams whose diffraction angles exceed the scanning angle envelope.

A 2nd identical telecentric lens 66 then re-collimates the beams 621 and directs them to intersect at the exit pupil as shown in FIG. 6. Note that only two of the four beams 621 are depicted by the two-dimensional figure. The remaining two beams, diffracted within the y'-z plane lying normal to the plane of the figure, are processed by the lens 66 in an identical manner. The four beams intersect at the exit pupil as shown and proceed to deviate from each other with increased distance along the optical axis. The beams are allowed to propagate out to a distance Δm beyond the exit pupil, at which point the beams cease to overlap.

$$\Delta_m = \frac{D}{\sqrt{2}\cos\theta} \quad (25)$$

At or beyond the distance Δm from the exit pupil, the four beams 621 encounter an optical element 68. The optical element 68 includes a set of four blazed transmission gratings arranged in a square mosaic configuration. Each beam intercepts a specific quadrant of the arrangement whereupon it is once again diffracted. Four transmitted 1st order beams 601 emerge parallel to the optical axis in a closely packed configuration and propagate to the four-channel shearing interferometer 35.

Figure 8:
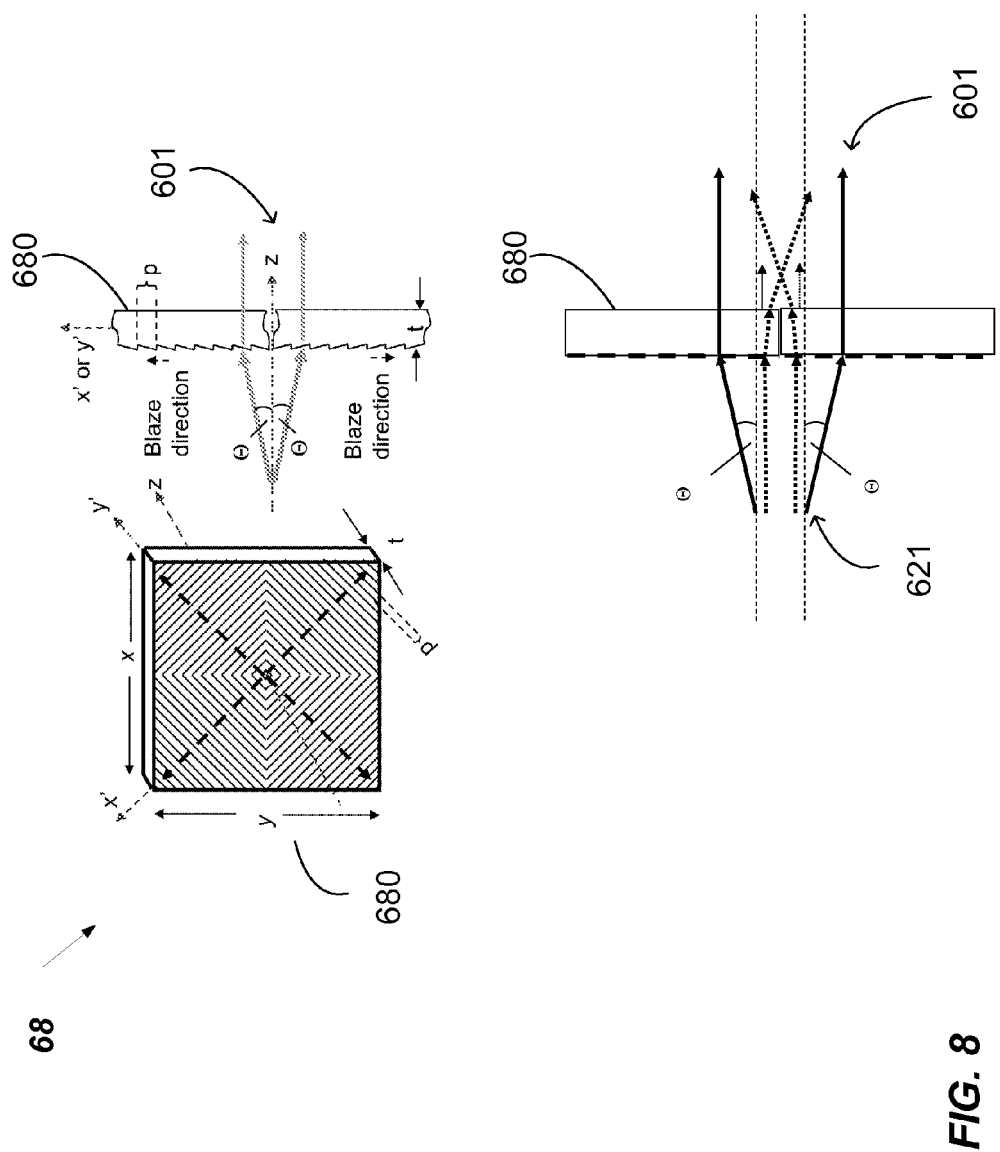
FIG. 8 illustrates an exemplary implementation of a beam steering element.

A schematic representation of the mosaic blazed grating element 68 is depicted in FIG. 8. In this exemplary implementation, the beam steering element 68 includes four ruled gratings on a single monolithic square glass substrate. In another exemplary implementation, the beam steering element 68 includes four individual blazed gratings that are mechanically positioned in a square assembly. The latter singulated grating implementation enables independent positioning between the respective gratings. These additional degrees of freedom may accommodate for any mis-orientations of the input beams 201.

Each quadrant of the beam steering element 68 includes a blazed grating having its grooves inclined at an angle of 45° with respect to the x and y-axes, as shown in FIG. 8. A grating frequency of 600 line/mm, which matches the grating frequency of the beam splitting element 62, is used to generate a 1st order beam that propagates along the optical axis. The blazed angle directions are oriented as shown in the side view of the beam steering element 680. This orientation of the blazed angles enables efficient diffraction of each incident light beam within its respective plane of incidence.

As discussed above, an added benefit that results from the use of gratings as the final beam steering element 68 is the anamorphic expansion that these gratings introduce. The anamorphic expansion identically compensates for (reverses) the anamorphic reduction (see EQ. 24) that is introduced by the 2D transmission grating 62. It is this feature that distinguishes the use of blazed gratings as the final beam steering element 68 in the proposed design of the wavefront replicator module 60, as opposed to beam steering elements based on wedge prisms. In the next sections it is shown that a mosaic assembly of wedge prisms, while able to efficiently steer the four beams back along the optical axis, cannot completely compensate for the anamorphic reduction unless combined with an additional set of compensating set of prisms resulting in a more complex design.

The side views of the beam steering element 680 in FIG. 8 emphasize the manner in which two diagonally opposed blazed gratings in a mosaic arrangement each diffract their respective incident beams 621. The corresponding 1st order beams are transmitted with high diffraction efficiency along the optical axis as shown, while the remaining weaker diffraction orders are deviated away from the axis in accordance with the general grating equation. Any of these weaker orders (including the unwanted $0^{th}$ order) that manage to reach the shearing interferometer 35 are blocked by the spatial filter 74-76 which is part of the shearing interferometer 35.

Blazed gratings are chosen for the beam steering element 68 since such gratings are designed to maximize the amount of light that is diffracted into the m=−1 order beam by virtue of a carefully engineered saw tooth groove profile which significantly enhances the diffraction efficiency. Commercially available blazed gratings exhibit a diffraction efficiency exceeding 50% for each polarization state at a wavelength of 532 nm.

A total of four diffraction orders thus emerge from the mosaic arrangement of the beam steering element 62 as four closely spaced light beams 601. The spacing between the emerging beams 601 may be adjusted by perturbing the position of the mosaic assembly with respect to the exit pupil of the 2nd telecentric lens 66, as shown in FIG. 6. The beams representing the four copies 6011-6014 of the wavefront shaped by the sample surface propagate towards the input of the four-channel shearing interferometer with integrated spatial phase shifting capability 35.

In the following sections of this application several implementations of the system 300 illustrated in FIG. 3 are described.

Figure 9:
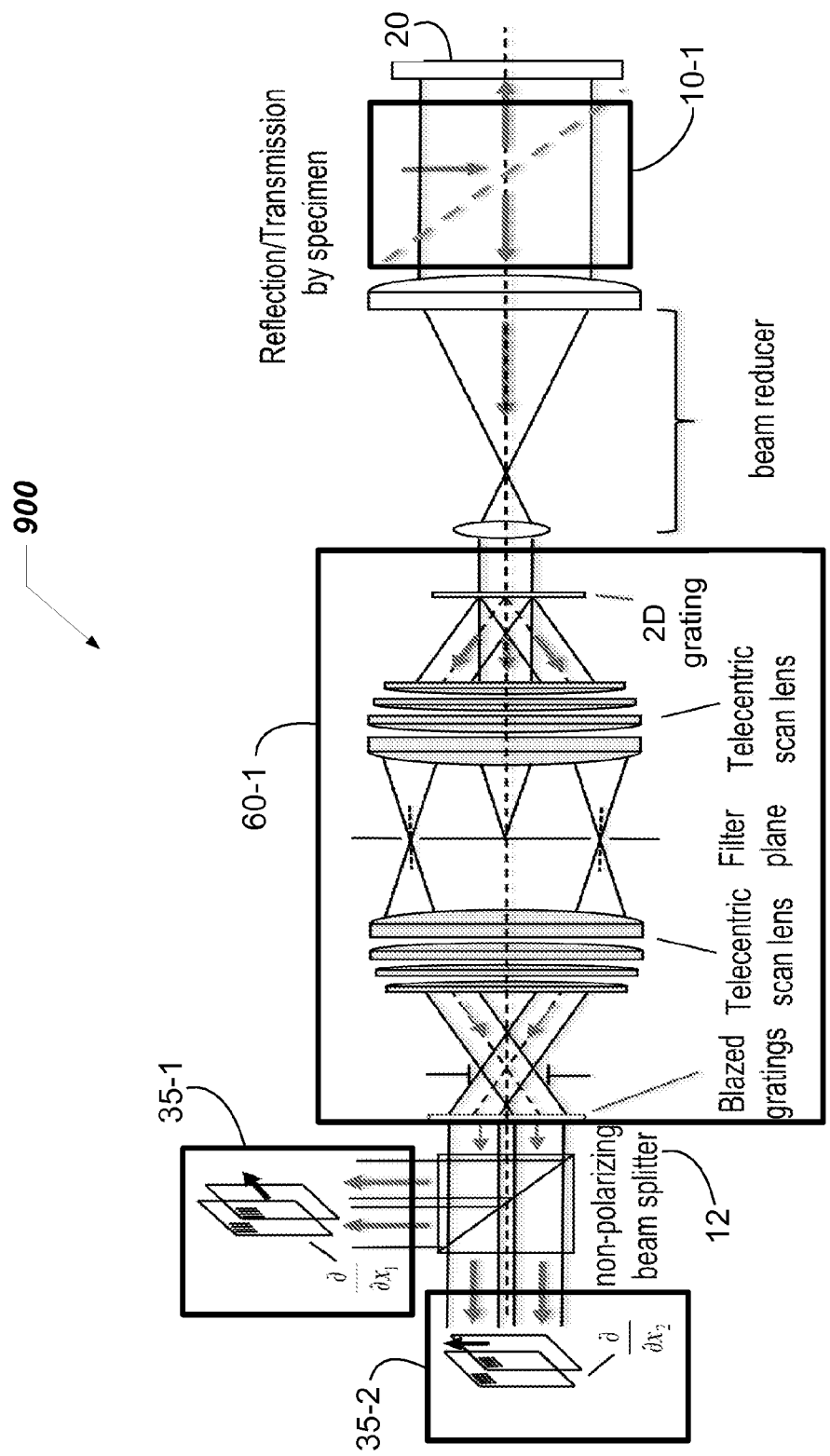
FIG. 9 illustrates an exemplary implementation of a system including a real-time phase shifting interferometer for obtaining instantaneous whole field mapping of various parameters of a sample surface.

FIG. 9 illustrates schematically portions of a real-time phase shifting interferometric system 900. The proposed system 900 can be used in either static or dynamic testing applications whenever it is necessary to simultaneously obtain both spatial derivatives of the optical wavefront.

The system 900 includes an optical probe beam module 10-1 described in detail in regard to FIG. 1(b). The normally reflected or transmitted wavefront is shaped by the sample surface 20. The wavefront that emerges from the specimen surface 20 is split into four copies using a wavefront replicator module 60, described in detail in regard to FIGS. 6-8. A non-polarizing beam splitter 12, placed just after the wavefront replicator module 60, splits the four emerging parallel beams into two separate beam trains.

Each train of beams is then directed to a separate four-channel shearing interferometer with integrated spatial phase shifting capability 35. Thus, the system 900 can simultaneously perform optical differentiation of the wavefront along the two primary coordinate directions as indicated in FIG. 9. Namely, the first four-channel shearing interferometer with integrated spatial phase shifting capability 35-1 performs shearing along the x1 coordinate, while the second four-channel shearing interferometer with integrated spatial phase shifting capability 35-2 performs shearing along the x2 coordinate.

Figure 10A:
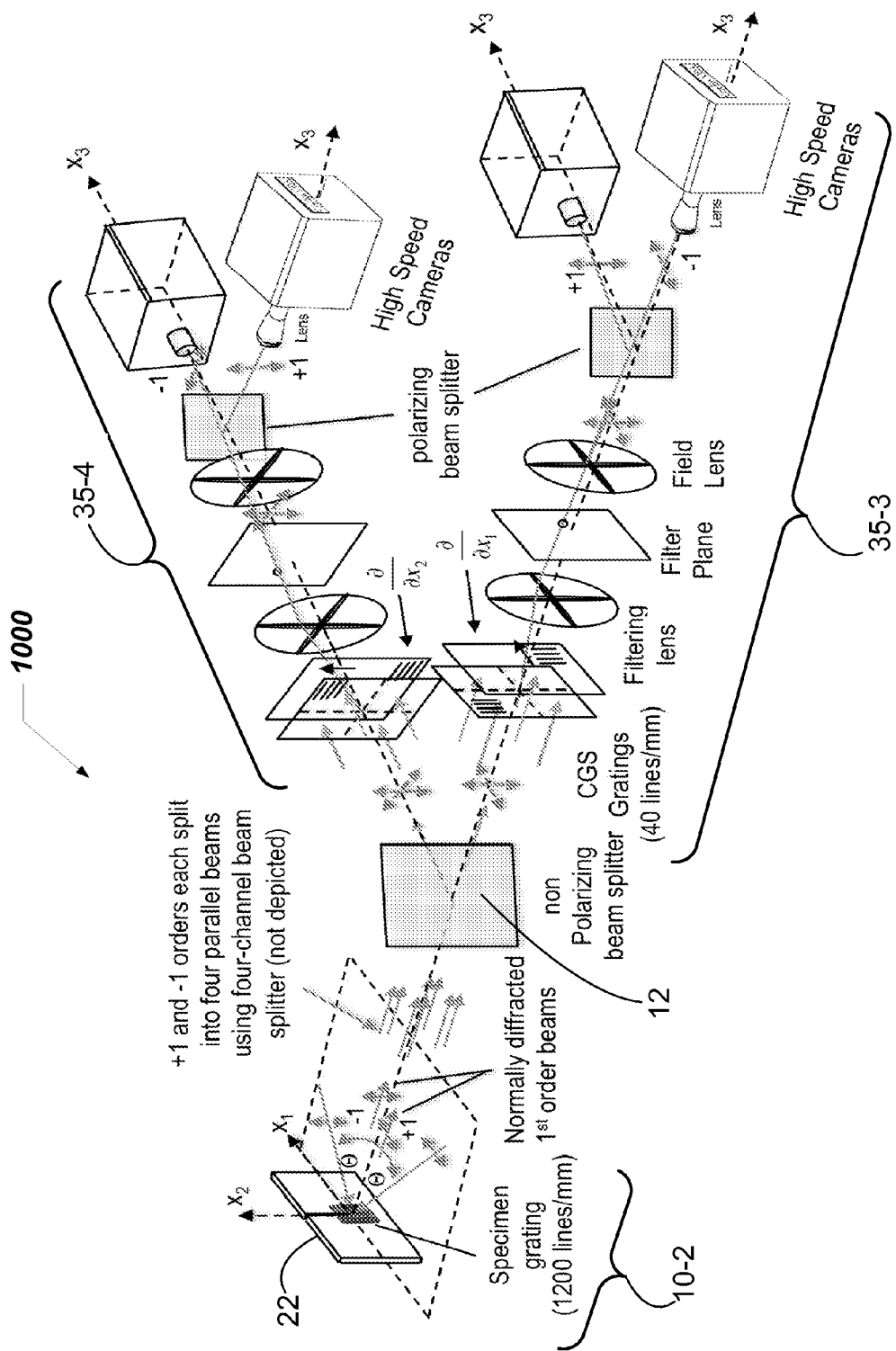
FIG. 10(a) illustrates an exemplary implementation of a system including two real-time phase shifting interferometers for obtaining instantaneous whole field mapping of various parameters of a sample surface.
Figure 10B:
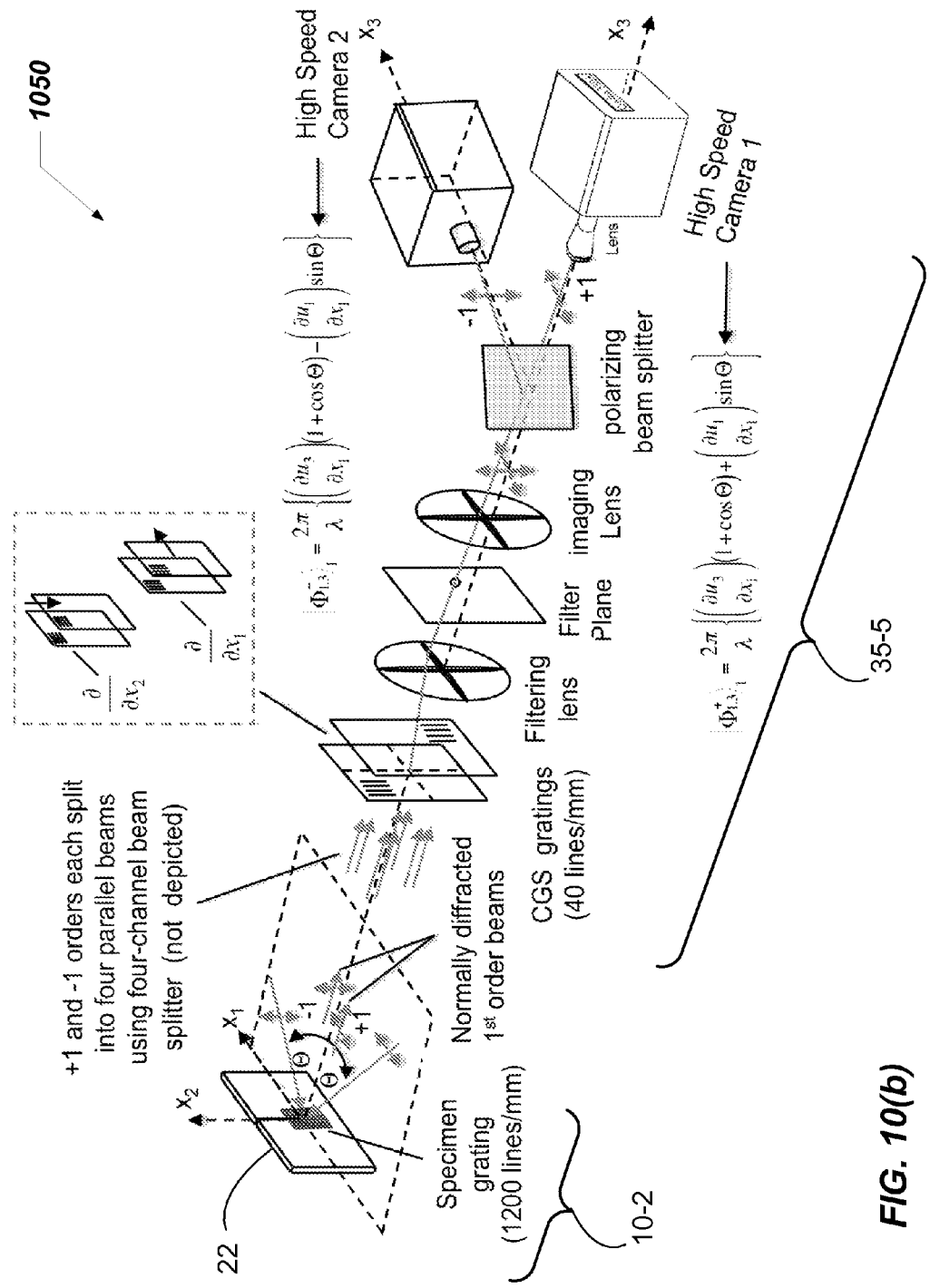
FIG. 10(b) illustrates another exemplary implementation of a system including a real-time phase shifting interferometer for obtaining instantaneous whole field mapping of various parameters of a sample surface.

FIGS. 10(a)-(b) illustrate how systems 1000 and 1050 use orthogonally polarized probe beams for simultaneous optical differentiation of the +1 and −1 normally diffracted beams. Each of the systems 1000 and 1050 uses two four-channel shearing interferometers with integrated spatial phase shifting capability 35 and can be used in either static or dynamic testing applications to simultaneously obtain both spatial derivatives of the optical wavefronts.

FIG. 10(a) depicts system 1000 that enables simultaneous optical differentiation of the +1 and −1 diffracted wavefronts along two independent coordinate directions. Optical probe beam module 10-2 provides two superimposed wavefronts that emerge from the specimen grating 22. The two superimposed wavefronts are rendered mutually incoherent by virtue of their orthogonal polarization states.

Both wavefronts are then split into four copies using the wavefront replicator module 60 (not shown in FIG. 10(a), but described in detail in regard to FIGS. 6-8). A non-polarizing beam splitter 12, placed just after the wavefront replicator module 60, splits the two sets of beams into two separate beam trains (as illustrated in FIG. 9).

Each beam train is then directed to a separate four-channel shearing interferometers with integrated spatial phase shifting capability 35-3 and 35-4. A polarizing beam splitter is placed after the final imaging lens, inside each real-time interferometer 35-3 and 35-4. The polarizing beam splitter is used to separate the sheared +1 and −1 diffracted orders. Four cameras are used to acquire both pairs of complementary fringe patterns for each arm of the system 1000. Because of the real-time capability of the four-channel shearing interferometers with integrated spatial phase shifting, a set of four instantaneous phase shifted interferograms can be acquired in one shot for each camera. That translates into a total of sixteen phase shifted interferograms produced in one shot by the system 1050. This large set of real-time phase shifted interferograms allows for the calculation of four simultaneous phase maps corresponding to various sample surface parameters, such as surface slopes and surface strains. Thus, system 1000 enables real-time monitoring of the sample surface 22 (for example a flat panel display) during stress tests, vibration tests or other dynamic durability tests that are being performed during the design and verification phase of the product life cycle.

FIG. 10(b) depicts a system 1050 that may be used in cases when optical differentiation of the diffracted wavefronts is provided along one coordinate direction. In this case both diffraction orders are simultaneously processed by the four-channel shearing interferometer with integrated spatial phase shifting capability 35-5. The sheared (mutually incoherent) +1 and −1 diffracted orders are finally separated by a polarizing beam splitter situated just beyond the imaging lens. Two cameras are used to acquire the pair of complementary fringe patterns.

The wavefront replication techniques described in this application can also be used to enable four-step π/2 spatial phase shifting schemes for other interferometer arrangements such as moire interferometers, Twyman-Green interferometers, and laser based Photo-elasticity. Other spatial (or real-time) phase shifting interferometry techniques devised for the interference techniques enumerated above rely upon a unique combination of polarizing optics to induce the proper phase shift. The four-channel beam splitting arrangement described in this application can be integrated to work with any of the techniques mentioned above. Table 1 provides a summary of these optical interference techniques, their respective modes of operation, and the associated whole field variable that results from the measurement of optical path difference through the use of phase shifting interferometry.

TABLE 1

Optical interference techniques amenable to four-channel spatial PSI, modes operation and associated field variables

| INTERFERENCE TECHNIQUE | MODE | FIELD VARIABLE |
|---|---|---|
| Coherent Gradient Sensor (CGS) | Diffraction | surface slopes/strain fields $\frac{\partial u_3}{\partial x_j}$ $j = 1, 2$; $\frac{\partial u_i}{\partial x_j} i = 1, 2; j = 1, 2$ |
| Coherent Gradient Sensor (CGS) | Reflection | surface slope: $\frac{\partial u_3}{\partial x_j}$ $j = 1, 2$ |
| Coherent Gradient Sensor (CGS) | Transmission | refractive index gradients: stress/fluid presure gradients $\frac{\partial \sigma_{ij}}{\partial x_j}$ $i = 1, 2$ $j = 1, 2$; $\frac{\partial p}{\partial x_j}$ $j = 1, 2$ |
| Moiré interferometer | Diffraction | in-plane displ. : $u_i(x_1, x_2, t)$; $i = 1, 2$ |
| Twyman-Green interferometer | Reflection | out-of-plane displ.: $u_3(x_1, x_2, t)$ |
| Twyman-Green interferometer | Transmission | index of refraction & thk. change: stress/fluid pressure $\sigma_{ij}(x_1, x_2, t); p(x_1, x_2, t)$ |
| Photo-elasticity | Transmission | shear stress: $2\tau_{max} = \sigma_1 - \sigma_2 = N F_\alpha/h$ |

An exemplary integration of the wavefront replication techniques described above with a Twyman-Green interferometer in reflection mode is explained here. Returning to system 300 in FIG. 3, a portion of the optical probe beam 101 is split before reaching the sample surface into a reference beam, for example, using a non-polarizing beam splitter 12. The reference beam is directed to a second wavefront replicator 60 to generate four spatially separated copies of the reference beam. The second wavefront replicator 60 can be implemented as described with respect to FIGS. 6-8, or other implementations presented later in reference to FIGS. 11-13.

Returning to FIG. 3, the four copies of the reference beam generated by the second wavefront replicator 60 are directed to the phase shifting interferometer 35. There are several ways for the set of four copies of the reference beams to interfere inside a Twyman-Green interferometer 35 with the set 601 of four copies of the wavefront that carries information about the sample surface.

In one implementation, a relative phase shift of π/2 is induced between the four spatially separated copies of the reference beam. Then, each phase shifted and spatially separated copy of the reference beam is caused to interfere with one of the spatially separated copies 601 of the wavefront. Thus, a set 351 of four phase shifted interferograms is obtained containing information on instantaneous surface parameters of the sample surface.

In another implementation, a relative phase shift of π/2 is induced between the four spatially separated copies 601 of the wavefront. Then, each phase shifted and spatially separated copy 601 of the wavefront is caused to interfere with one of the spatially separated copies of the reference beam. Once again, a set 351 of four phase shifted interferograms is obtained containing information about instantaneous surface parameters of the sample surface.

For the remainder of this application several other implementations of the wavefront replicator are described.

Figure 11A:
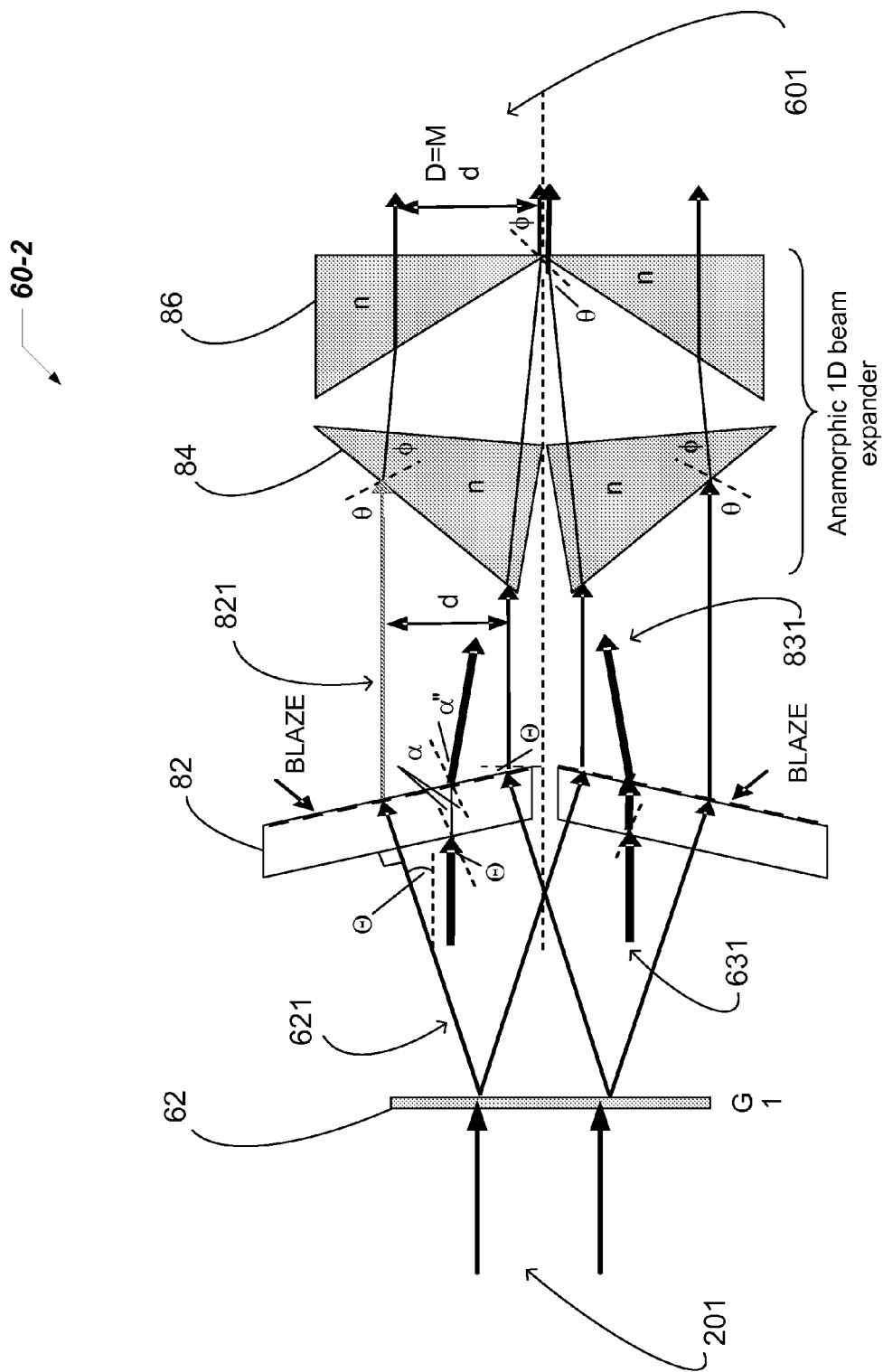
FIGS. 11(a) and 11(b) illustrate another exemplary implementation of a wavefront replicator module.
Figure 11B:
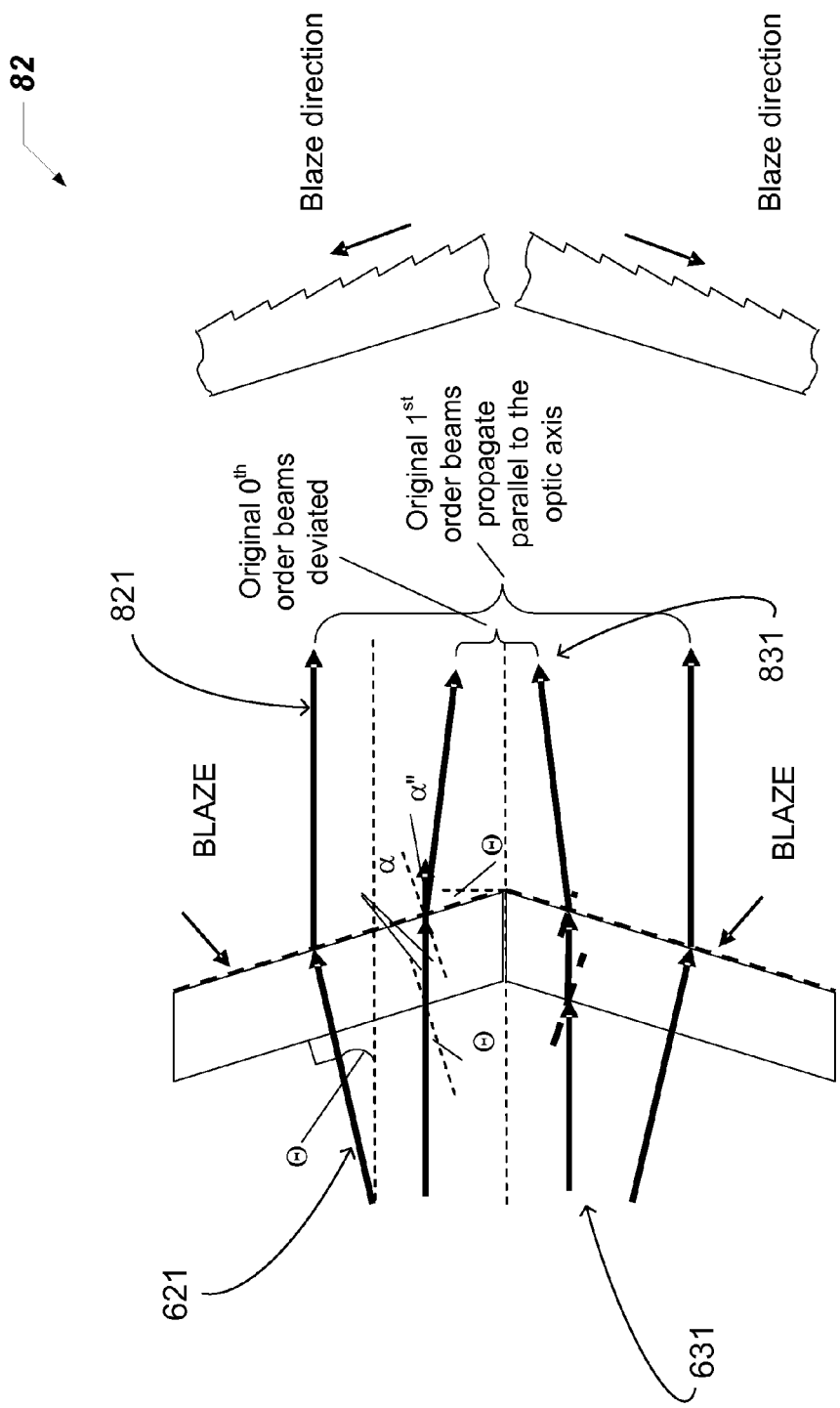

FIG. 11 illustrates another exemplary implementation of the wavefront replicator 60-2. The wavefront replicator 60-1 discussed previously (see FIGS. 6-8) features beam splitting elements, beam steering elements, and a spatial filter to remove unwanted diffraction orders. The wavefront replicator 60-2 includes, besides beam splitting elements and beam steering elements, an anamorphic beam expander.

The beam splitting element 62 is the same 2D grating used in the wavefront replicator 60-1. The beam steering component 68 of the wavefront replicator 60-1 is replaced in FIG. 11 with another beam steering element 82. The beam steering element 82 is tilted so as to make the incident 1st order diffracted beams 621 from the grating 62 normal to the blazed grating substrate of beam steering element 82.

Efficient diffraction of the beams 621 results along a direction parallel to the optic axis, beam 821, by virtue of the blazed grating profile. The $0^{th}$ order diffracted beam 631 is refracted by the back of the grating window and approaches the grating at an angle a with respect to the normal. The 0th order light beam 631 from grating 62 is therefore deviated away (beam 831) from the optical axis through a combination of refraction and diffraction. The beam 831 can be filtered out downstream by the spatial filter included inside the real-time shearing interferometer 35.

As discussed regarding the wavefront replicator 60-1, an astigmatic distortion of the wavefront 201 is introduced using this double grating arrangement. Each time the beam is diffracted there is a slight diameter reduction which results in the diffraction plane. The diffracted beam diameter is reduced as shown in EQ. 24. Hence, the 1st order beams 621 from grating 62 suffer an astigmatic compression in the diffraction plane followed by a second astigmatic compression of the same magnitude which is introduced to the beams 821 by the blazed gratings 82. The net distortion of the beam diameter given by $(\cos \theta)^2$. The net effect caused by elements 62 and 82 is to compress the beam diameters along an axis parallel to the grating grooves.

An anamorphic 1D beam expander follows the tilted blazed grating element 82 in order to offset this distortion. Therefore, a pair of prisms 84 and 86 as depicted in FIG. 11 are placed downstream from element 82. The prisms 84 and 86 are each part of a mosaic prism arrangement. The anamorphic beam expander formed by the prisms 84 and 86 expands a beam 821 by precisely the same amount that the beam 821 is shrunk by double diffraction at elements 62 and 82. Note that there is also a lateral shift of the beam toward the optical axis. The effect is greatly exaggerated in the FIG. 11, but would otherwise be a small shift for small magnification corrections.

Figure 12:
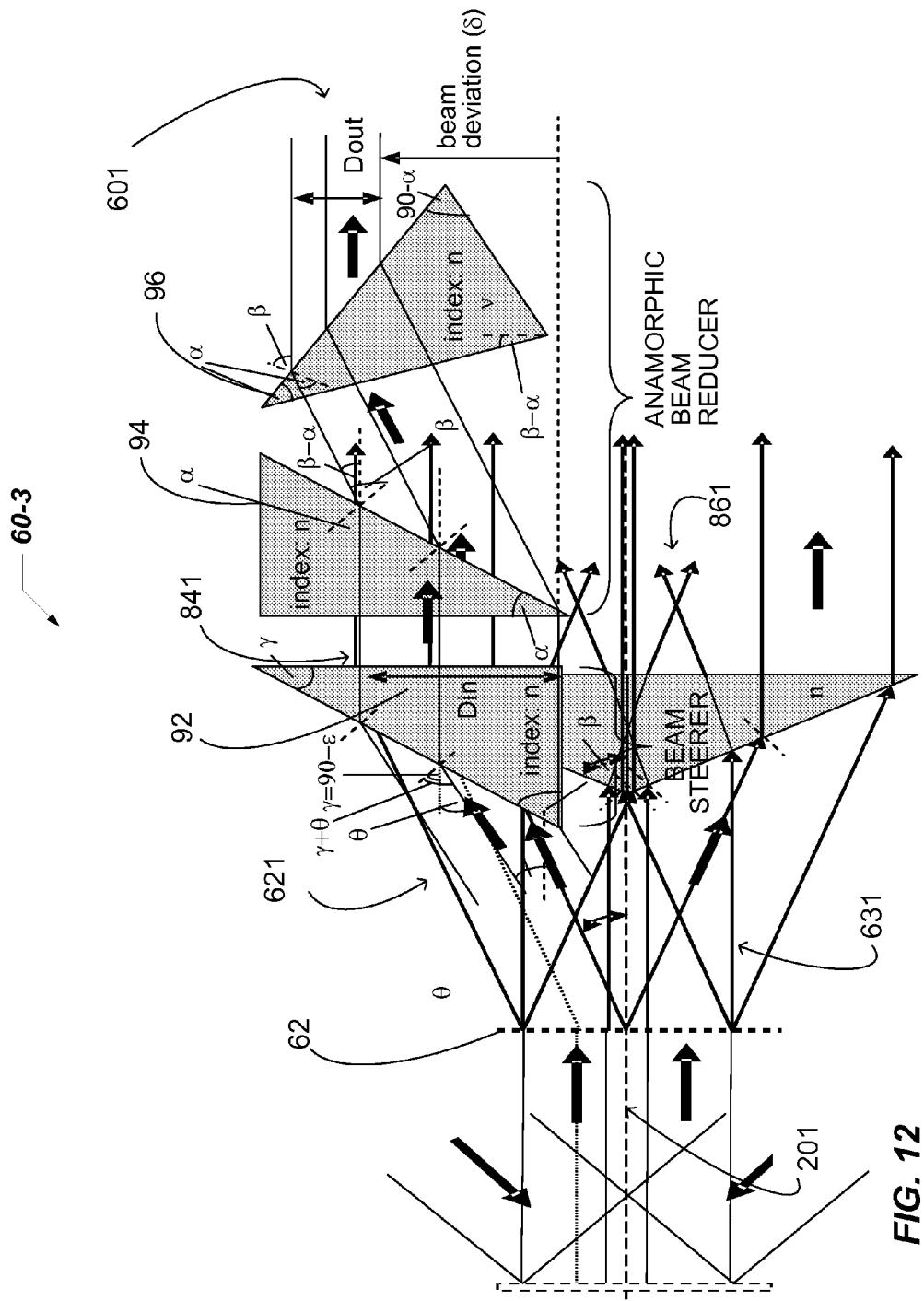
FIG. 12 illustrates portions of yet another exemplary implementation of a wavefront replicator module.

FIG. 12 illustrates another exemplary implementation of the wavefront replicator 60-3. The wavefront replicator 60-3 includes the beam splitting element from implementations 60-1 and 60-2. The beam steering element of the wavefront replicator 60-3 is different from the previous implementations. An anamorphic beam reducer is also included in the wavefront replicator 60-3.

A mosaic arrangement of optical wedges (or prisms) 92 is used to refract the 1st order beams 621 diffracted by beam splitting element 62. The refracted transmitted beams 841 are redirected parallel to the optical axis. The residual 0th order beams 631 are refracted away from the optical axis (beams 861).

Anamorphic distortion is introduced by the prisms 92 and the refracted beam expands in the bending plane. Beam expansion will be partly offset by beam contraction along the same axis which is introduced by diffraction at grating 62. The combined effect of these astigmatic distortions can be further corrected through the use of an anamorphic 1D beam reducer 94 and 96 following the mosaic wedge plate assembly 92.

Figure 13:
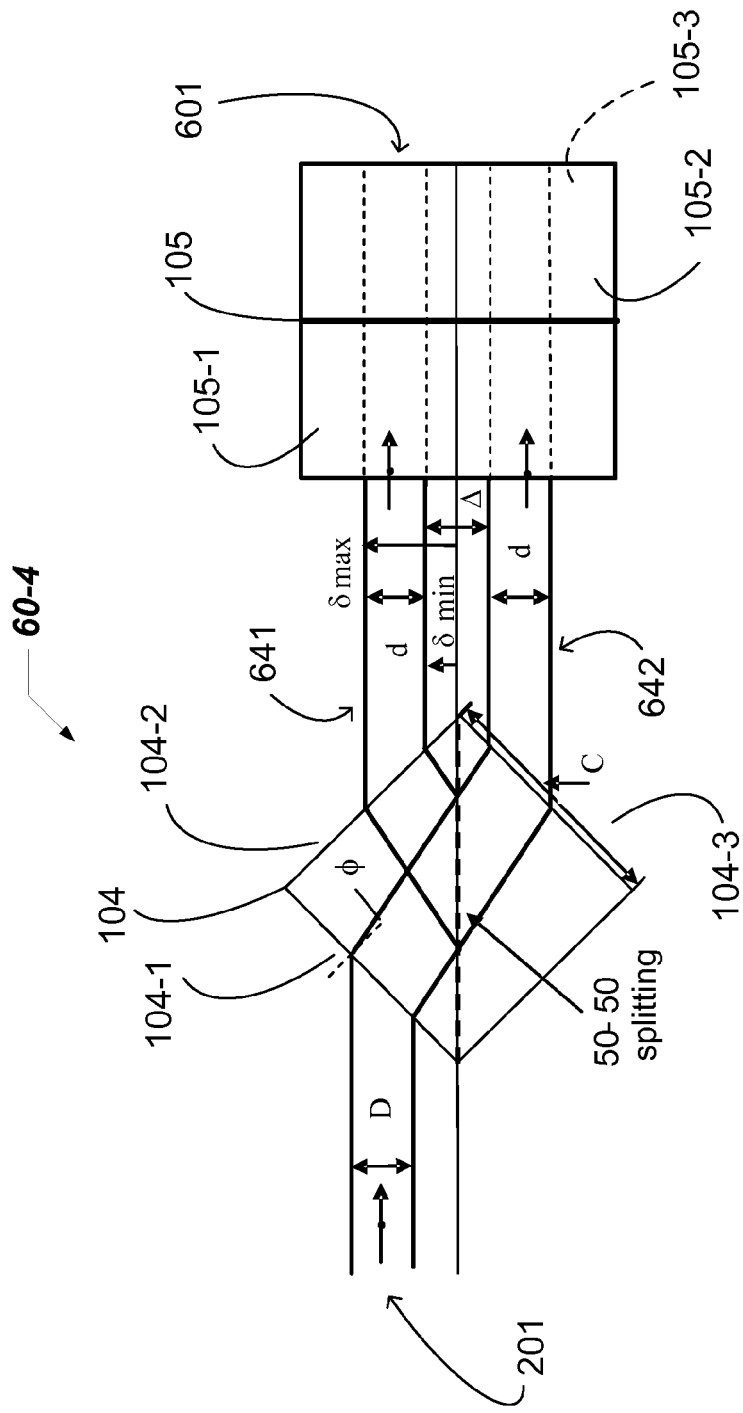
FIG. 13 illustrates an exemplary implementation of a compact wavefront replicator module.

FIG. 13 illustrates yet another exemplary implementation of the wavefront replicator 60-4. This implementation of the wavefront replicator 60-4 does not use grating elements, instead both beam splitting and beam steering functions are played by optical prisms.

FIG. 13 depicts how two cube beam splitters 104 and 105 can be arranged in order to generate four collimated tightly spaced beams 601 from one original collimated beam 201. A side view of the first beam splitter 104 and a top view of the second beam splitter are shown in FIG. 13. The second beam splitter 105 is rotated by 90 degrees with respect to the first cube 104.

The original collimated beam 201 enters the beam splitter cube 104 through face 104-1. Two copies 641 and 642 of the original beam 201 are generated due to a 50-50 split at the cube interface. The first copy 641 emerges from the first beam splitter cube 104 through face 104-2, while the second copy 642 emerges from the first beam splitter cube 104 through face 104-3. The two copies 641 and 642 enter the second beam splitter cube 105 through face 105-1. Two copies of each of copy 641 and 642 are generated due to a 50-50 split at the cube interface. Thus, four copies 601 of the original beam 201 have been created. Two of the four copies emerge from the second beam splitter cube 105 through face 105-2, while the other two copies emerge from the second beam splitter cube 105 through face 105-3 (in FIG. 13, face 105-3 is situated under the plane of the page, not in direct view).

There are no anamorphic beam expansion effects specific to design 60-4, assuming that the input beam 201 is collimated.

There are a few properties specific to this implementation that are addressed below. The reflections at the beam splitter interface invert the wavefront and so after passing through two beam splitters four uniquely inverted variants of the electric field $E(x,y)$; $E(-x,y)$; $E(-x,-y)$; $E(x,-y)$ are obtained. When wavefront shearing is conducted on these conjugate wavefronts, for example using a phase shifting interferometer 35, four spatially misregistered interferograms are obtained.

There is also a size limit to which a beam splitter 104 of this type can be manufactured. This size limitation determines the subsequent maximum beam diameter which can be handled using this implementation. Commercially available cube beam splitter dimensions are typically (25.4 mm)3 and (50.8 mm)3 while custom cubes in the size range of 3-4 inch may be manufactured. A 4" cube can accommodate a 30 mm+diameter laser beam.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated.

What is claimed is:

1. A method for optically characterizing a sample surface, comprising:
operating a laser to produce a single probe beam that is collimated and coherent;
directing the single probe beam onto an area of incidence on a sample surface;
obtaining a wavefront that propagates away from the area of incidence, wherein a phase of the wavefront carries information on the sample surface;
operating an optical interferometer to obtain copies of the wavefront, wherein the copies are spatially separated;
operating the optical interferometer to induce a relative phase shift of $\pi/2$ between the copies of the wavefront;
operating the optical interferometer to cause interference between each copy of the phase shifted wavefront and a corresponding reference wavefront based on a self-referencing interferometry, without using a reference reflector separated from the sample surface, to obtain optical interferograms from the sample surface that are relatively separated in phase by $\pi/2$; and
processing the obtained optical interferograms to extract information on the sample surface,
wherein each copy of the phase shifted wavefront is self-referenced through a laterally sheared duplicate wavefront which operates as a respective corresponding reference wavefront produced by using two grating elements spaced along a propagation direction of each phase-shifted wavefront to produce each respective optical interferogram of the optical interferograms.

2. The method as in claim 1, wherein:
the two grating elements spaced along the propagation direction of each phase-shifted wavefront are a first grating element that includes gratings shifted laterally by a quarter pitch between adjacent gratings, and a second grating element downstream from the first grating element having a uniform groove pattern and same pitch as the gratings of the first grating element, and
the method further includes:
operating the first grating element to shift by $\pi/2$ the relative phase of spatially separated copies of a sample wavefront that carries information on the sample surface, and
operating the second grating element to shear the phase shifted copies of the sample wavefront.

3. The method as in claim 2, comprising:
operating an imaging component to capture the phase shifted shearing interferograms generated by the first and second grating elements; and
processing the interferograms to obtain information on the sample surface.

4. A system comprising:
a probe beam module to generate a coherent optical probe beam and to direct the probe beam to a sample surface;
a wavefront replicator module configured to generate four spatially separated copies of a sample wavefront, wherein a phase of the sample wavefront carries information on the sample surface addressed by the probe beam;
an interferometer configured to:
simultaneously shift by $\pi/2$ the relative phase of each copy of the sample wavefront;
cause interference of the four phase shifted copies of the sample wavefront with a corresponding reference wavefront; and
simultaneously generate four interferograms having a common phase term, wherein the common phase term is the phase of the sample wavefront;
a phase map processor to process the four simultaneously generated interferograms to obtain the common phase term; and
a surface map processor to extract the information on the sample surface from the obtained common phase term,
wherein the interferometer comprises a pair of optical elements comprising:
a first optical element including four adjacent gratings forming a quadrant layout in a plane transverse to a common propagation direction of the four copies of the sample wavefront, wherein:
each of the four copies of the sample wavefront impinges on a different quadrant of the first optical element;
a pitch and a groove direction are common between each grating; and
a groove pattern in each quadrant is offset laterally by a quarter pitch to simultaneously introduce a relative phase shift of $\pi/2$ between the four copies of the sample wavefront; and
a fifth grating downstream from and parallel with the first optical element to cause optical shearing interference of the four phase shifted copies of the sample wavefront, wherein:
the optical aperture of the fifth grating is at least the size of the first optical element;
the groove pattern is uniform over the entire surface of the fifth grating; and
the pitch and groove direction are common with the four gratings of the first optical element.

5. The system of claim 4, wherein the information extracted by the surface map processor comprises a map of one or more of:
a surface shape;
field gradients for out of plane displacements on the sample surface; and
field gradients for in-plane displacements on the sample surface.

6. The system of claim 4, wherein the interferometer comprises:
a spatial filtering lens downstream from the fifth grating to focus sheared optical beams diffracted by the fifth grating;
an opaque screen situated in the focal plane of the spatial filtering lens, wherein the opaque screen passes a set of diffracted beams while blocking other unwanted diffraction beams
an imaging lens situated a focal length distance downstream from the opaque screen to image each sheared optical beam, to a quadrant of a camera sensor, wherein each image represents one of the simultaneously phase shifted interferogram having a common phase term.

7. The system of claim 4, wherein the wavefront replicator module comprises:
a beam splitting optical element to receive the sample wavefront and to generate four secondary wavefronts; and
a beam steering optical element located downstream from the beam splitting element, wherein the beam steering element:

adjusts a propagation direction, a beam separation and any one-dimensional distortions of the four secondary wavefronts; and obtains four spatially non-overlapping, substantially identical copies of, and propagating along substantially parallel directions as, the sample wavefront.

8. The system of claim 7, wherein the beam splitting optical element comprises:

a two dimensional grating tuned to maximize the energy in four first order diffracted beams, wherein crossed groove directions are oriented at 45 degrees with respect to x-y axes in a plane transverse on the propagation direction of the sample wavefront, to project the four first order diffracted beams into a square pattern about the propagation direction of the sample wavefront.

9. The system of claim 7, comprising:

a spatial filter downstream from the beam splitting optical element to eliminate unwanted orders of diffraction comprising:

a first telecentric lens to focus the four first order diffracted beams into small spots at a focal plane of the first telecentric lens, wherein the first telecentric lens diameter is chosen to block higher diffraction orders;

an opaque screen situated at the focal plane of the first lens, wherein the opaque screen:
features four appropriately distributed openings which pass the first order diffracted beams, and
blocks the $0^{th}$ order diffraction beam; and a second telecentric lens situated a focal length distance downstream from the opaque screen to re-collimate the four first order diffracted beams.

10. The system of claim 7, wherein the beam steering optical element comprises:

four adjacent gratings forming a mosaic layout in a plane:
transverse to the propagation direction of the sample wavefront; and
situated downstream from the spatial filter to allow for complete spatial separation of the first order diffraction beams before reaching the mosaic layout plane;

wherein the grating in each quadrant of the mosaic layout has grooves:
separated by the same pitch as the crossed grooves of the beam splitting element;
oriented parallel to one of the two directions of the crossed grooves of the beam splitting element; and
aligned in opposite direction relative to the adjacent quadrants, wherein the beam steering element:
directs the first order diffraction beams substantially parallel to the propagation direction of the sample wavefront; and
compensates for a reduction in beam diameter along a bending direction of the first order diffraction beams introduced upstream by the beam splitting element.

11. The system of claim 7, wherein the beam steering optical element comprises:

four adjacent gratings forming a first mosaic layout situated in a plane:
transverse to the propagation direction of the sample wavefront; and
downstream from the beam splitting optical element to allow for complete spatial separation of the first order diffraction beams before reaching the first mosaic layout plane;

wherein the grating in each quadrant of the first mosaic layout is inclined relative to the first mosaic layout plane to receive the respective impinging first order diffraction beam normal to the surface of the grating, wherein each grating of the first mosaic layout has grooves:
separated by the same pitch as the crossed grooves of the beam splitting element;
oriented parallel to one of the two directions of the crossed grooves of the beam splitting element; and
aligned in opposite direction relative to the adjacent quadrants, wherein the four adjacent gratings forming the first mosaic layout direct the first order diffraction beams substantially parallel to the propagation direction of the sample wavefront; and a beam expander including a plurality of optical prisms forming a second mosaic layout, downstream from the first mosaic layout, and a third mosaic layout, downstream from the second mosaic layout, to compensate for a reduction in beam diameter along a bending direction of the first order diffraction beams, introduced by the beam splitting optical element and the first mosaic layout, while maintaining the propagation direction of the compensated beams parallel to the propagation direction of the sample wavefront.

12. The system of claim 7, wherein the beam steering optical element comprises:

four adjacent prisms forming a first mosaic layout situated in a plane:
transverse to the propagation direction of the sample wavefront; and
downstream from the beam splitting optical element to allow for complete spatial separation of the first order diffraction beams before reaching the first mosaic layout plane, wherein the four adjacent prisms forming the first mosaic layout direct the first order diffraction beams substantially parallel to the propagation direction of the sample wavefront; and a beam reducer including a plurality of optical prisms forming a second mosaic layout, downstream from the first mosaic layout, and a third mosaic layout, downstream from the second mosaic layout, to compensate for an effective increase in beam diameter along a bending direction of the first order diffraction beams, introduced by the beam splitting optical element and the first mosaic layout, while maintaining the propagation direction of the compensated beams parallel to the propagation direction of the sample wavefront.

13. The system of claim 4, wherein the wavefront replicator module comprises:

a first beam splitting cube to receive the sample wavefront and to generate two secondary wavefronts which are spatially separated and propagate along substantially parallel directions as the sample wavefront; and a second beam splitting cube to receive the two secondary wavefronts generated by the first beam splitting cube to generate four spatially separated copies of the sample wavefront propagating along substantially parallel directions as the sample wavefront.

14. An apparatus comprising:
a sample holder to hold a sample under test;
an optical probe module to direct coherent light to the sample surface;
a first grating element comprising four gratings shifted laterally by a quarter pitch between adjacent gratings to shift by $\pi/2$ the relative phase of four spatially separated copies of a sample wavefront that carries information on the sample surface;

a second grating element downstream from the first grating element having a uniform groove pattern and same pitch as the gratings of the first grating element, wherein the second grating element shears the four phase shifted copies of the sample wavefront;

an imaging component to capture four phase shifted shearing interferograms generated by the first and second grating elements; and a processor to manipulate the generated four interferograms to obtain information on the sample surface.

15. The apparatus of claim 14 comprising:

a third grating element including a crossed groove pattern situated upstream from the first grating element to split the sample wavefront into four diffracted wavefronts;

a fourth grating element situated between the third and first grating elements, wherein the fourth grating element comprises four gratings alternately ruled along one of the two groove directions of the third grating element to capture the four diffracted wavefronts and to obtain four spatially separated copies of and parallel to the sample wavefront.

16. The apparatus of claim 14 wherein the imaging component comprises a camera wherein each quadrant of camera imaging sensor captures one of the four phase shifted shearing interferograms.

17. The apparatus of claim 14 wherein the imaging component comprises four cameras wherein each camera captures one of the four phase shifted shearing interferograms.

* * * * *

UNITED STATES PATENT AND TRADEMARK OFFICE
CERTIFICATE OF CORRECTION

| | | |
|---|---|---|
| PATENT NO. | : 7,990,543 B1 | Page 1 of 1 |
| APPLICATION NO. | : 12/203050 | |
| DATED | : August 2, 2011 | |
| INVENTOR(S) | : Mello et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 258 days.

Signed and Sealed this
Twentieth Day of December, 2011

David J. Kappos
*Director of the United States Patent and Trademark Office*